(12) United States Patent
Kailash et al.

(10) Patent No.: US 6,219,727 B1
(45) Date of Patent: Apr. 17, 2001

(54) APPARATUS AND METHOD FOR COMPUTER HOST SYSTEM AND ADAPTOR INTERRUPT REDUCTION INCLUDING CLUSTERED COMMAND COMPLETION

(75) Inventors: Kailash Kailash, San Jose; Balakrishna B. Bayar; Vytla P. Chandramouli, both of Fremont; Sanjeev B. Gokhale, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/326,736

(22) Filed: Jun. 4, 1999

Related U.S. Application Data

(63) Continuation of application No. 09/136,645, filed on Aug. 18, 1998.
(60) Provisional application No. 60/088,201, filed on Jun. 5, 1998.

(51) Int. Cl.⁷ .............................. G06F 13/00; G06F 13/24; G06F 9/44
(52) U.S. Cl. ............................... 710/48; 710/1; 710/266; 709/301
(58) Field of Search ................... 710/1, 48, 260–262, 710/266, 269, 100, 24, 52; 709/100, 301; 370/490; 711/112

(56) References Cited

U.S. PATENT DOCUMENTS

| | | | |
|---|---|---|---|
| 4,093,825 | * | 6/1978 | Gladstone et al. . |
| 5,179,704 | * | 1/1993 | Jibbe et al. . |
| 5,557,756 | * | 9/1996 | Spencer . |
| 5,608,891 | * | 3/1997 | Mizuno et al. . |
| 5,925,115 | * | 7/1999 | Ponte . |

FOREIGN PATENT DOCUMENTS

| | | |
|---|---|---|
| 0 508 602 A2 | 10/1992 | (EP) . |
| 0 685 798 A2 | 5/1995 | (EP) . |
| 2 298 306 | 8/1996 | (GB) . |
| WO 94/22082 | 9/1994 | (WO) . |

OTHER PUBLICATIONS

Oct. 19, 1999, PCT International Search Report; US99/12551.

* cited by examiner

*Primary Examiner*—Gopal C. Ray
(74) *Attorney, Agent, or Firm*—Flehr Hohbach Test Albritton & Herbert

(57) ABSTRACT

The number of interrupts are controlled by delaying communication of the interrupt to the host computer or processor according to predetermined rules. This reduces the processing overhead and greatly increases system performance. Application of the inventive structure and method to network servers and RAID disk drive storage arrays is particularly beneficial. In one embodiment, the invention provides structure and method for reducing the number of system interrupts to the host processor to reduce host processor overhead for operation of a computer system having a host processor and a peripheral device coupled to the host processor by a device controller. In another embodiment, the invention provides structure and method for clustering command completion prior to posting completion. System, apparatus, method, and computer program products are described.

26 Claims, 18 Drawing Sheets

"SIR" System Side (S/W, F/W Only) Initialization (Boot/Reset/Plug-In)

Exemplary Procedure For Hardware Interrupt Generator (HIG)

Exemplary Procedure Executing In Host (Software/Firmware)
For Hardware Interrupt Generator (HIG) Implementation

APPARATUS AND METHOD FOR COMPUTER HOST SYSTEM AND ADAPTOR INTERRUPT REDUCTION INCLUDING CLUSTERED COMMAND COMPLETION

RELATED APPLICATIONS

This application is a continuing application under 35 U.S.C. 120 of U.S. Utility patent application Ser. No. 09/136,645, filed Aug. 18, 1998 and titled "*Clustered Command Completion*", which claims the benefit of U.S. Provisional Patent Application Serial No. 60/088,201 filed Jun. 5, 1998 and titled "*Apparatus and Method for Computer Host System and Adaptor Interrupt Reduction*", each of which patent applications are hereby incorporated by reference in their entirety.

FIELD OF THE INVENTION

This invention relates generally to the field of interrupt processing including clustering command completion in a computer system, and more particularly to apparatus and method for reducing the number of interrupts in a computer system and reducing the overhead as a result of posting command completion to reduce processing overhead and thereby enhance a computer system, particularly input/output performance.

BACKGROUND OF THE INVENTION

In a conventional computer server system, a primary measure of performance is he number of transactions per minute (TPM) handled by the server system. One of the major impediments to a high TPM throughput is the number of interrupts handled and processed per second by the host computer or server system. On most server systems, two types of interrupts predominate: (1) disk drive I/O interrupts handled in conjunction with a disk drive controller, and (2) workstation interrupts generated by one or more workstation nodes and handled through the network controller. There may be more than one of each of these types of controllers and there may be other types of controllers appropriate to the devices attached to the host as well.

If we consider a Redundant Array of Independent Disk (RAID) drive array and the disk I/O interrupts generated by or in conjunction with that RAID array, a better understanding of the impediments imposed by conventional systems will be appreciated. By way of example, a Transaction Processing Counsel-Type C (TPC-C) system running a 10,000 TPM load in a conventional system may typically generate about 6,000 input/output (I/O) operations per second. Handling each interrupt may typically involve executing between about 500 and about 4000 instructions. For example, the DAC960 requires about 564 instructions for each interrupt, and the Flashpoint requires about 3657 instructions. Therefore, the total I/O interrupt processing overhead for 6,000 I/O operations per second system may typically run into millions of instructions per second. For example, for a 6000 interrupts/sec system needing 500 instructions/interrupt, three million instructions/sec are executed.

The impact of interrupts can be particularly significant when the computer system is a network server configured and operable to serve input/output (I/O) requests for data or program information from a large number of workstation users. These conventional systems handle interrupts as they occur with only minor variations that may occur when the system is heavily loaded, and even under such heavily loaded condition, the delay in handling interrupts is not a controlled delay, rather it is the result of system capacity limitations. It will therefore be appreciated that in conventional systems, neither the number of I/O operations nor the number of interrupts generated by those I/O operations are constrained, controlled, or optimized to reduce the interrupt related overhead and improve system performance.

In similar manner, the total overhead to process one Input/Output (I/O) completion runs into thousands of processor instructions, and I/O completion processing overhead runs into millions of instructions per second.

Locking overhead, added by the multiprocessor system, is an additional burden. The locking cycle is particularly problematic and a burden on the system because for at least most microprocessors, locking stops all activity on the system bus during the lock cycle.

For every completed I/O, device drivers typically do number of calls before posting the completion to the file system or original request. In most of the operating systems, device drivers are layered, therefore the same functions are called for every I/O. For example, a low level controller driver typically makes calls to an upper level disk driver for every I/O. These call operations are summarized as follows:

(a) Controller driver calls disk driver.
(b) Controller driver frees up the associated I/O request buffer/resource.
(c) Controller driver does at least one set of lock/unlock per I/O request to free the buffer/resource.
(d) Disk driver calls upper level driver.
(e) Disk driver frees up the associated I/O request buffer/resource.
(f) Disk driver does at least one set of lock/unlock per I/O request to free the buffer/resource.

Therefore there remains a need to reduce the impact of interrupts in a computer system, particularly when the computer system is a network server configured and operable to serve input/output (I/O) requests for data or program information from a large number of workstations.

SUMMARY OF THE INVENTION

The number of interrupts are controlled by delaying communication of the interrupt to the host computer or processor according to predetermined rules. In some cases, this controlled delay or interrupt clustering may result in a slight increase in I/O response time, but this possible response time increase is generally negligible relative to overall performance increase realized, and the effect of any response time increase actually lessens for higher performance systems. This reduces the processing overhead and greatly increases system performance. Application of the inventive structure and method to RAID disk drive storage arrays is particularly beneficial.

In one embodiment, the invention provides structure and method for reducing the number of system interrupts to the host processor to reduce host processor overhead for operation of a computer system having a host processor and a peripheral device coupled to the host processor by a device controller, where the method includes: detecting the occurrence of an input/output interrupt related to a device; reserving notification to the host processor of the input/output interrupt for a period of time according to predetermined rules; notifying the host processor of all input/output interrupts for which notification has been reserved during the period of time at the expiration of the period of time; where the reserved notification lowering the overhead to the host processor in handling the input/output interrupts.

In another embodiment, the invention provides structure and method for clustering command completion prior to posting completion. The inventive method includes the steps of identifying completed I/O requests which can be completed in clustered mode, gathering all completed I/O requests which can be completed in clustered mode to the same receiver function, chaining all completed requests with the last I/O in the chain, and sending completion to requestor with one pointer which is at the head of the chained request.

Apparatus, system, method, and computer program product are provided which cover various embodiment of the invention.

DETAILED DESCRIPTION OF THE EMBODIMENTS

Figure 1:
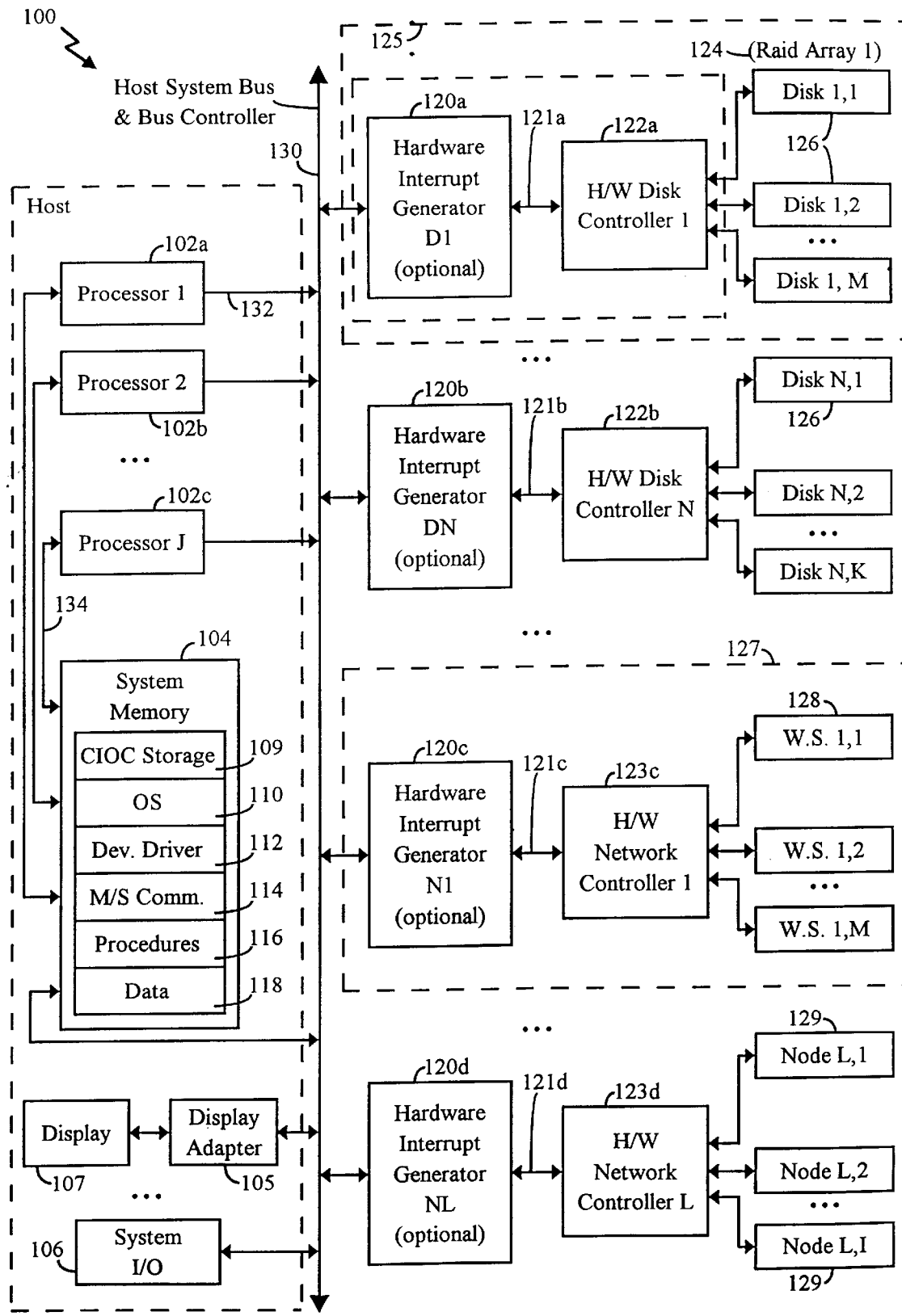
FIG. 1 is block diagram of an exemplary embodiment of a computer system incorporating inventive hardware features which may be used in conjunction with the inventive structure and method.

In the inventive structure and method, the number of interrupts per second are controlled by delaying communication of the interrupt to the host according to predetermined rules or procedures, as described in greater detail below, so that the number of interrupts are reduced. In some cases, this controlled delay or interrupt clustering may result in a slight increase in I/O response time. But this possible response time increase is usually negligible relative to overall performance increase realized, and the effect of any response time (the duration or period of time starting when the host sends the command to the controller and ending when the host gets the response back from the controller) increase actually lessens for higher performance systems. This reduces the processing overhead and increases system performance greatly. The performance improvement is greatest for faster systems, even though performance increases independent of system speed. Performance improvement is better because although the total overhead is the same, the per unit of overhead or equivalently, the overhead per transaction decreases for faster systems.

An "interrupt" as used in this description is the method or procedure by which any hardware controller can inform the host that some event has occurred. For example, an I/O interrupt informs the host that I/O has occurred. Interrupt handling conventionally means a method or procedure by which the interrupt condition is investigated, the interrupt acknowledged (so that the next interrupt that might occur can be raised), and taking appropriate action for the event.

We now describe the manner in which response time and system performance are related using an example of a disk drive of the type used for network server applications and having a response time (access time) of 8 ms (15 ms in TPC-C measurement). If we add an average 1 ms delay to each of these 8 ms disk response times, the system response time will not change by very much (about 12% in the most extreme case) but the processor or CPU system performance is improved because rather than the 6,000 interrupts per second typical of conventional systems, the number of interrupts is reduced to 500 interrupts per second. A system may do more than one I/O for a single transaction. For example, the system may perform 4 I/O and the transaction may take 100 ms to complete. In this example, adding 1 ms to each I/O will only add 4 ms to the 100 ms transaction time, resulting in only a 4% increase.

By way of numerical example, we have already described the manner in which a TPC-C system running at 10,000 TPM load generates about 6,000 I/O interrupts per second. By employing the inventive structure and method and limiting the number of interrupts to 500 I/O per second with possible average increase in response time of about 1 ms and an approximate maximum increase of response time of 2 ms, the system will generate only 500 interrupts per second instead of the 6,000 interrupts per second for the conventional system. In an analogous manner for a system processing 20,000 transactions per minute and employing the inventive structure and method, the system will generate only 500 interrupts per second versus the expected 12,000 interrupts per second using conventional techniques. Therefore it is clearly seen that on a faster system (e.g. 20,000 TPM system) fewer interrupts are generated per I/O than on the slower system (e.g. 10,000 TPM system). These are averages and maximum and the actual delay may be less than the cited number or even zero for any particular event.

Of course, the invention is not limited to controlling the number of interrupts to 500 interrupts per second or any other number, and the entries in the above table are merely illustrative of the average, maximum, and minimal increase in response time as a function of the number of interrupts per second ranging from 100 interrupts per second to 1,000 interrupts per second. Those workers having ordinary skill in the art in light of the disclosure provided herein, will appreciate that controlling the number of interrupts between the number of interrupts in an uncontrolled conventional system and some smaller number of interrupts will effect a performance improvement, where the nature and degree of the performance improvement may generally depend on the system speed, nominal device response time, system configuration, selected maximum number of interrupts per second, and other system parameters. Some of these considerations and tradeoffs are described more fully hereinafter.

The inventive structure and method may be implemented within software and/or firmware in conventional hardware without utilizing optional special purpose hardware so that the inventive method and procedures are applicable to existing computer system hardware, including disk controllers, disk devices, processors, memory, and the like computer system components without modification. Alternatively, and with certain advantages, certain specialized hardware structures may be employed to implement the inventive method either alone or with a combination of inventive software and firmware.

We now describe a first exemplary embodiment of the inventive structure with respect to FIG. 1. In this system 100, one or more processing units 102 (e.g. processor 1, processor 2, . . . , processor J) are coupled to system memory 104, and to a bus 130, such as a system bus. The system bus 130 may be any one of the conventionally known computer bus types such as for ISA, AT, PCI, SCSI, or Scalable Coherent Interface (SCI) busses; however, for a high performance computer server configuration, the system bus will more typically be a high performance bus, such as a PCI bus. Other conventional hardware components such as a display adapter 105, system I/O 106, keyboards, tape drives, mass storage devices, and the like may also be configured to interface via the system bus 130 or by other conventional connections. The inventive structure and method are not limited to any particular bus type or configuration, or hardware components or component connectivity, unless specifically described as requiring a particular structure or connectivity in the specification. Conventional computer elements not necessary to describe the inventive structure and method have been eliminated from the figures so as not to obscure the invention itself.

With further reference to the exemplary embodiment in FIG. 1, two types of device controllers are shown, disk drive controllers and network workstation or network node controllers. A disk subsystem 125 is responsible for interfacing between the devices (e.g. disk drive) and the host. The second type of unit generating interrupts within system 100 is a network controller 123. A network controller 123 is responsible for monitoring and controlling operation of a plurality of workstations 128 or other network nodes 129. In an analogy to the disk subsystem 125, each network node subsystem 127 includes one or more workstations or nodes, a network controller 123, and a hardware interrupt generator 120 coupled between the network controller 123 and the system bus 130. None, one, or a multiplicity of such subsystems 125, 127 may be provided. Operation of the invention for each subsystem type, peripheral device, and controller are substantially the same, so that in the remainder of the description we focus attention on the disk subsystem. Those workers having ordinary skill in the art in light of this description will appreciate that the inventive principles for reducing the number and/or frequency of interrupts to the host apply to other computer devices and/or controller structures.

Disk controller 1 (122*a*) is responsible for controlling one or more hard disk devices 126. Here an array of M disk drives are shown configured as RAID array 124. It is conventionally known that RAID is a technology used to improve I/O performance and reliability of mass storage devices. In such a configuration, data is stored across a plurality of disks in order to provide immediate access to the data despite one or more disk drive failures. The RAID technology is typically associated with a taxonomy of techniques, where each technique is referred to by a RAID level. Six basic RAID levels are conventionally acknowledged, each having certain benefits and disadvantages. The RAID configurations, and advantages and disadvantages of each, are well known in the art and not described further here.

A typical data storage system, such as may be implemented on a system file server for a network, can contain a number of disk storage devices that can be arranged in accordance with one or more RAID levels. A RAID controller is a device that is used to manage one or more arrays of RAID disk drives. The RAID controller, among other functions, is responsible for configuring the physical drives in a data storage system into logical drives where each logical drive is managed in accordance with one of the aforementioned RAID levels.

While the inventive structure are not limited to RAID configurations or to network servers, network server systems may frequently implement a RAID configuration to maintain data redundancy and data integrity. Therefore, RAID arrays are conveniently used to describe a exemplary embodiments of the inventive structure and method and to provide a standard basis of comparison between the operation and performance of the inventive structure and method as compared to conventional structures and methods.

In the exemplary embodiment of FIG. 1, disk controller 122*a* may for example be a RAID disk array controller controlling multiple disk drives 126 in RAID array 124. Disk controller 122*a* is coupled to an optional hardware interrupt generator D1 120*a* which in turn is coupled to system bus 130. The set of disks may number from one or a few to a hundred or more disk drives and each of these disk drives is controlled by the same disk controller 122*a* Hardware interrupt generator (HIG) D1 is described as "optional" because although it offers some performance advantages (such as for example, the software in the disk controller does not have to evaluate when to generate the interrupt), alternative embodiments that realize the inventive structure and method using conventional hardware may be used. Each of these alternative embodiments are described hereinafter.

This combination of disk drives, disk controller and hardware interrupt generator may for convenience be referred to as a disk subsystem 125. As illustrated relative to FIG. 1, the system 100 may include one or more of these disk subsystems 125, each including one or more disk drives, a disk controller and a optional hardware interrupt generator. For example, an $n^{th}$ disk subsystem 125 having a array of k disk drives, a disk controller n 122b coupled to a hardware interrupt generator DN 120b via a connect interface 121b may also be provided. The hardware interrupt generator (HIG) is required only for the hardware implementation, and is not provided in the software implementation.

In addition to these hardware elements, certain memory storage is provided in the disk and/or network controllers for storage of certain data and procedures related to the inventive method. Furthermore, for an all software or firmware implementation, certain hardware elements such as the HIG may be eliminated.

Particular data and other storage structures that may be provided in system memory and within the disk and/or network controllers and/or the various hardware interrupt generators are described relative to the particular inventive methodology.

Figure 2:
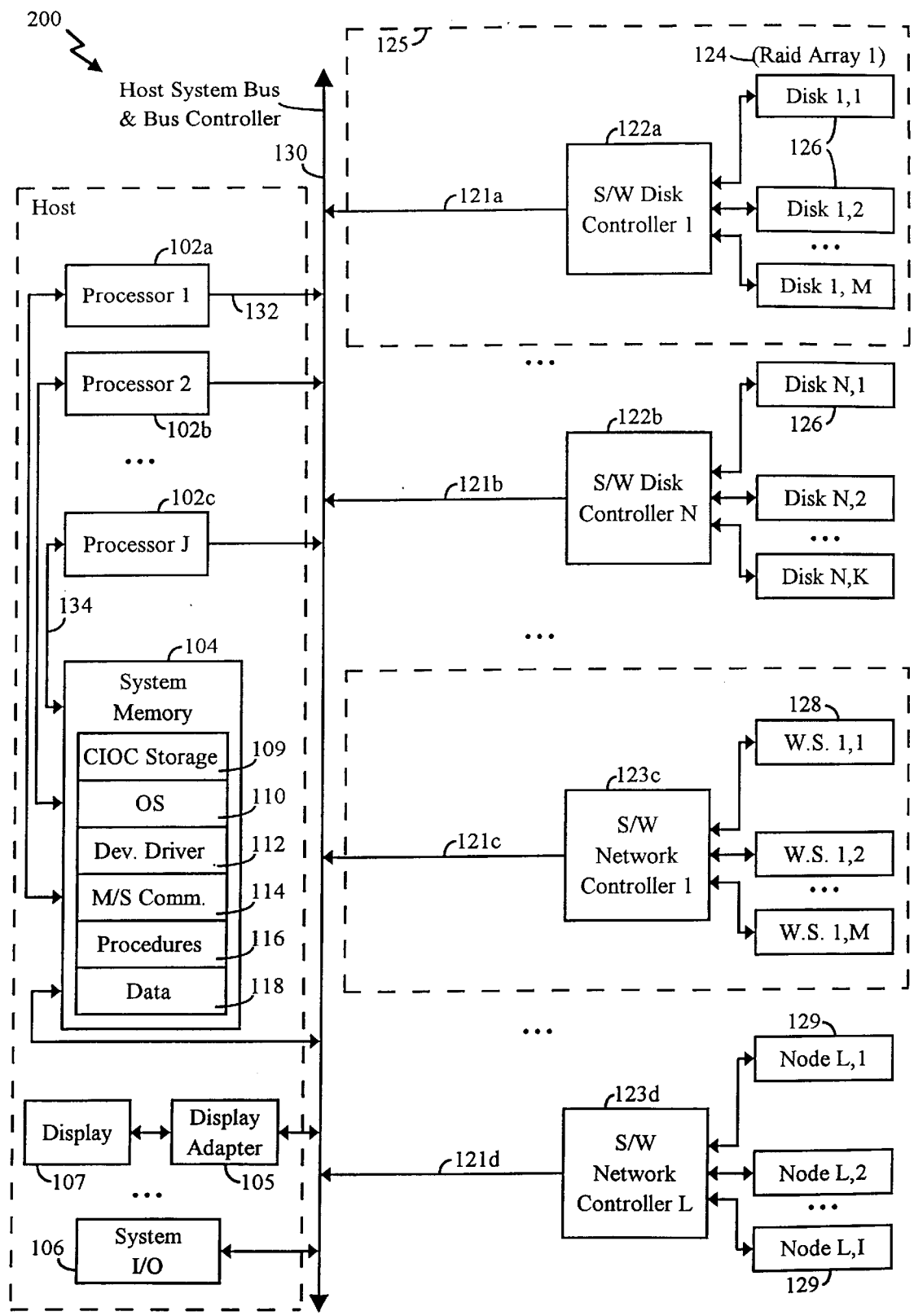
FIG. 2 is block diagram of an exemplary embodiment of a computer system using conventional hardware components which may be used in conjunction with the inventive method.

A second inventive structure is now described relative to FIG. 2, which shows a hardware configuration wherein the controllers 122a, 122b, 122c, 122d are coupled directly to the system bus 130 without intervening hardware interrupt generators. While some sacrifices in performance, such as executing a greater number of instructions may occur, the second embodiment has the advantage that the inventive method and procedures can be implemented with conventional controllers, controlled devices, host processors, and the like. Certain modifications to the conventional hardware are beneficial, including the provision, allocation, and partition of certain data structures within the controller and host. These differences are further described relative to the inventive method which follows.

We now describe the inventive method for reducing the number of device and host interrupts. Advantageously, the procedures for reducing device and host interrupts are used concurrently; however, the procedure for reducing system interrupts may be used alone. The procedure for reducing device interrupts requires implementation of the inventive procedure for reducing host interrupts or a different procedure that provides comparable functionality relative to the device interrupts.

In the descriptions that follow, references to the host or system side refer to the host system, including the CPU, host system bus 130, bus controller or controllers, host memory 104, and like elements associated with the host. On the other hand, references to the controller or controller side, refer to the particular peripheral device controller, devices controlled by that peripheral device controller, and in certain embodiments of the invention, the hardware interrupt generator. For example, in the embodiment of FIG. 1, the controller side would refer to each of the RAID disk array 124 including disks 126 (or workstations 128 or nodes 129), the disk controller 122a (or network controllers 123), and the hardware interrupt generators 120.

In some instances, reference is made to master or primary controller, and one or more slave or secondary controllers. Procedures for selecting the primary and secondary controllers are described hereinafter. The structure of the primary and secondary controllers may actually be identical in some embodiments, and only the operation may differ in that the master controller has additional duties not performed by the slave controllers.

Figure 3:
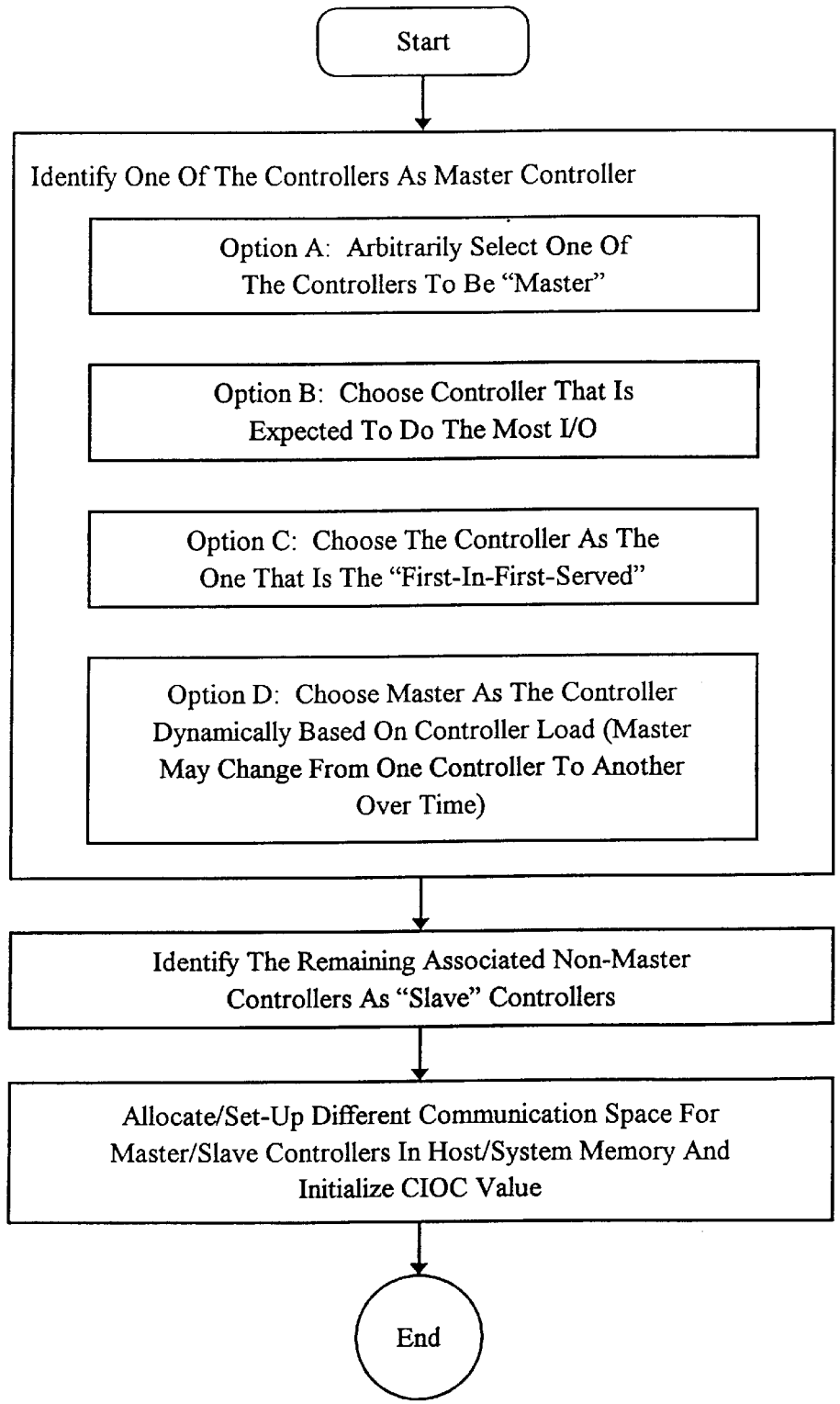
FIG. 3 is a flow chart diagram of an exemplary embodiment of a system interrupt reduction initialization procedure.

An exemplary procedure for a system interrupt reduction initialization procedure is now described relative to FIG. 3.

Where two or more device controllers of the same type are provided in the computer system, performance is enhanced by identifying one of the two or more controllers as the master or primary controller and each of the other controllers of the same type as slave or secondary controllers. Master controllers and slave controllers may have the same physical structure but are assigned different functional duties according to their designation and configuration as master or slave. We address the different responsibilities of master and slave controllers in greater detail hereinafter.

For example, if there are four disk array controllers and four workstation controllers, one of the disk array controllers will be identified as the disk array master controller and the other three disk array controllers are identified as the associated slave controllers to that disk array master controller. The disk array master controller is responsible for its input/output interrupts as well as the input/output interrupts from the three other disk array controllers associated with it. In a sense the slave controllers report to the master controller in a hierarchical manner. Similarly, of the four workstation controllers, one is designated as the master or primary workstation controller, and the other three workstation controllers are designated as slave or secondary workstation controllers which report to the master workstation controller.

While a computer system operating with several types of controllers (e.g. disk array and workstation controllers) might be configured with a single master controller chosen from among the disk array and workstation controllers, such configuration and operation is not preferred because of the different operating characteristics, interrupt event frequency, and other factors. In the inventive structure and method, it may typically be desirable (though not necessary) to select the interrupt reduction parameters for each master controller or type of master controller differently to optimize system performance.

The manner in which master controller(s) are selected or designated from among a plurality of controllers present in the system is firstly dependent on whether the inventive interrupt reduction is implemented in general purpose computer hardware or in specialized hardware. Where specialized hardware is used, the hardware and its connectivity to other system components designates some controllers as masters and others as slaves. This specialized hardware and connectivity is described subsequently in connection with an exemplary hardware embodiment of the invention. In software and firmware implementations of the invention the master controller or master controllers are identified during boot, reset, power-on, plug-in, or the like initialization phase of operation.

With further reference to FIG. 3, there is shown a flowchart diagram of an exemplary controller initialization procedure 300. The procedure starts (Step 301) upon one of the aforementioned initialization conditions, and one of the controllers is identified as the master controller (Step 302). While almost any rule or procedure may be used to select the master controller with correspondingly better or poorer performance results, at least four options make good sense. In a first option (Option A) the master controller is arbitrarily selected as any one of the plurality of controllers (Step 303). This selection criteria may be entirely feasible where each controller has similar input/output loading, or where input/output loading for each set of controlled devices is unknown or cannot be predicted accurately.

In a second option (Option B), the master controller is selected to be the controller that is expected to do the most input/output (Step 304) based on one or more predetermined factors or criteria. Selecting the master controller as the controller expected to perform the most input/output has certain performance advantages that are tied to an embodiment of the inventive method wherein a query is made relative to input/output interrupts, the master controller being queried first and the slave controllers being queried only if the master controller has had no activity. By designating the controller predicted to have the most activity as the master, on a statistical basis at least, it is more likely that the slave controllers will not require the query operation. Hence, performance is improved.

In a third option (Option C), the master controller is selected on a first-in-first served basis (Step 305). Under the first-in-first-served procedure, the master controller is selected to be the controller that was found first during the scan, such as for example, found according to the order on the PCI bus during system configuration. This procedure is particularly advantageous for writing code and physical determination of the master controller.

A fourth option (Option D), provides that the master controller is chosen dynamically during operation of the computer system based on the loading experienced by the several controllers (Step 306). Under this procedure, the designation as master controller and function performed by the controllers may change from one controller to another controller over time. These four options are meant to be exemplary, and the inventive structure and method are not limited to these selection procedures.

Once the master controller is selected, the remaining controllers are associated with a master controller (Step 310). Where several different types of controlled devices are attached to the computer system, each type of device advantageously has its own master controller selected in accordance with the above description. The selection criteria may be different or the same for each master controller.

Finally, once the master controller has been selected, the other controllers are designated as non-master or slave controllers associated with a particular master controller, and a master-slave communication space, preferably implemented with a data structure in physical memory of the host, is established (Steps 312, 314) for communicating the completed I/O activity information between each master and each associated slave controller. The information stored by each controller (including completed input/output counts-CIOC) and read by the master controller from this communication space is described subsequently. In principle, the memory could be located anywhere, including in any of the controllers if access was allowed between controllers across the bus; however, in some systems such cross-bus access is not supported.

By way of summary, on the host side during computer system initialization and prior to said receiving a request for interrupt generated by a controller, one of the plurality of device controllers is chosen and identified as a master controller, the other controllers being slave controllers, and a master-slave communication memory storage space is defined in a memory store for storage of said input/output related information, particularly including a count related to completed input/output for each controller.

Having described an exemplary embodiment for which a master controller is selected or otherwise designated or identified, we now describe alternative embodiments in which there is no reason or requirement to select a master controller. Such a system configuration is now described relative to the diagrammatic illustration in FIG. 4.

Figure 4:
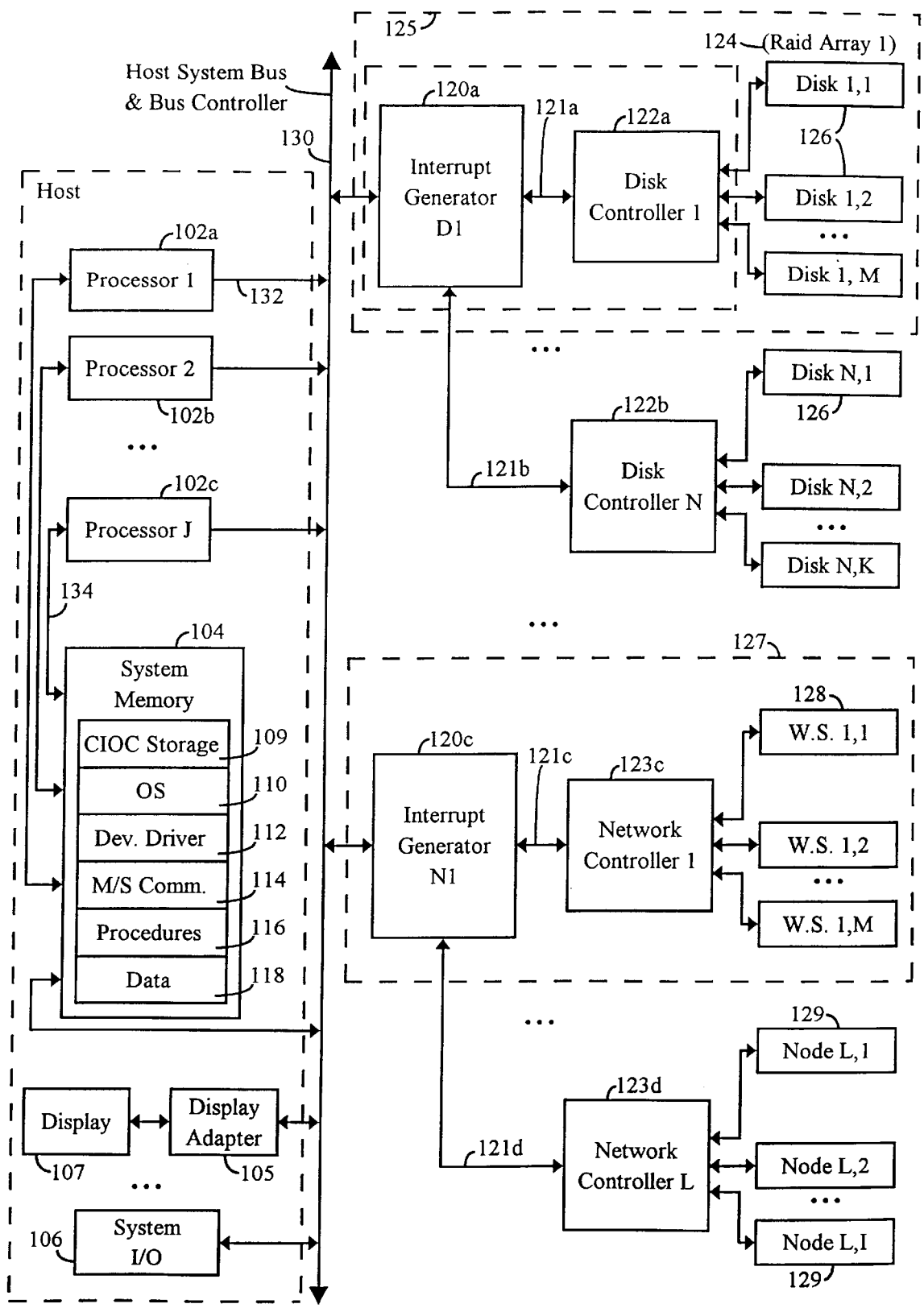
FIG. 4 is a flow chart diagram of an alternative exemplary embodiment of a system interrupt reduction procedure in which there is no reason or requirement to select a master controller.

In this embodiment, each of the devices of a particular type (e.g. all of the disk drives, or all of the workstations) are connected to a single hardware interrupt generator which serves as the master. In the embodiment of FIG. 4, there is one disk drive HIG and one workstation HIG, each serving as the master. This configuration is advantageous because the overhead for a system having only a single interrupt generator is reduced (as compared to a multiple interrupt generator configuration) because the predetermined number of interrupts (e.g. 500 interrupts) apply to all of the disk drives, rather than only to the disk drives connected to a particular master controller or slave controller. For example, in an embodiment having two disk controllers each serving three disk drives, there will be 500 interrupts for each controller and a total of 1000 interrupts for both controllers. The system response time will increase by some number of milliseconds, say x milliseconds. If each of the six disk drives are instead serviced by a single interrupt generator, then the response time will still be x milliseconds, but the total number of interrupts decreases from 1000 to 500.

Figure 5:
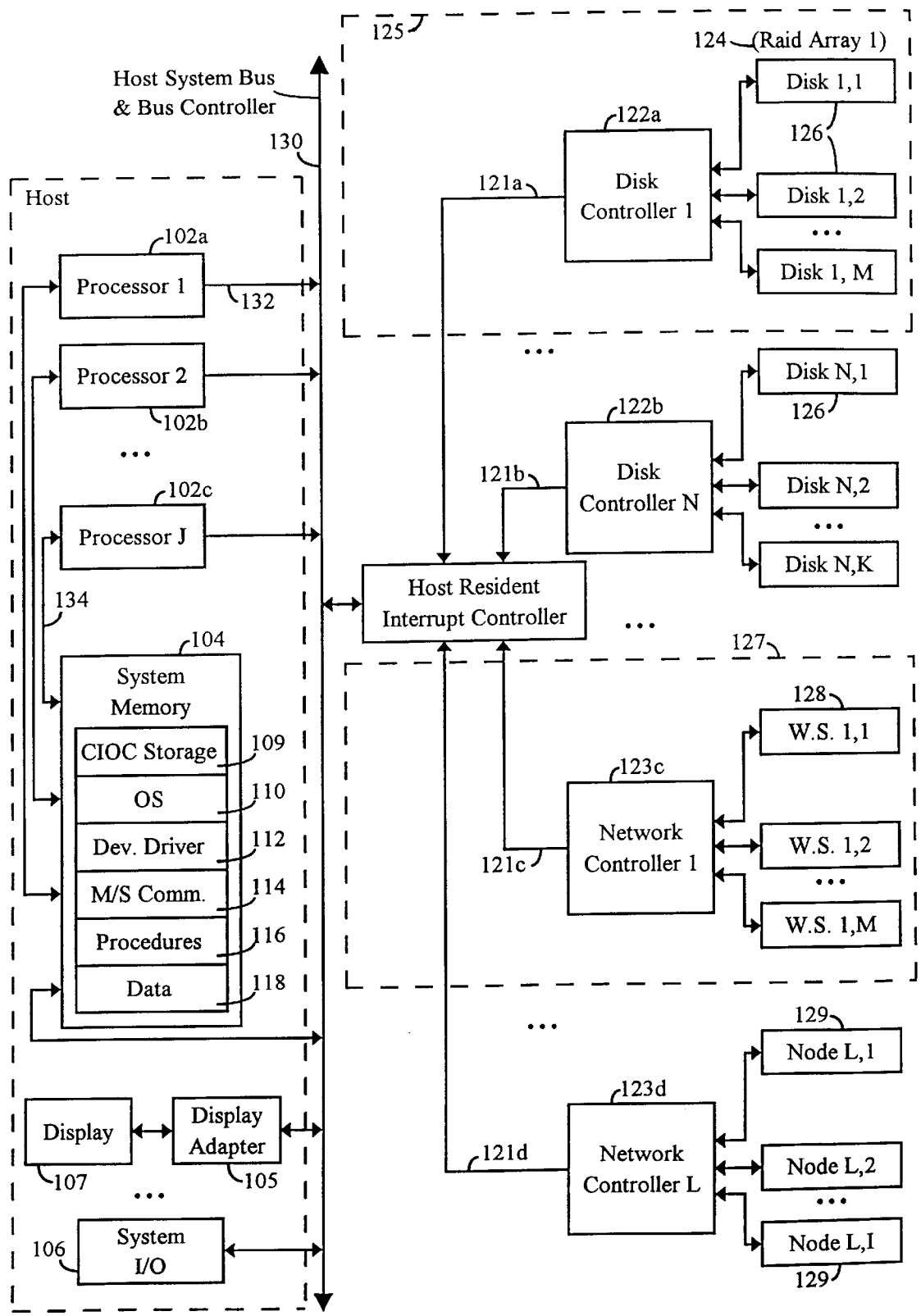
FIG. 5 is a flow chart diagram of another alternative exemplary embodiment of a system interrupt reduction procedure in which a single interrupt controller is provided within the host so that only a single interrupt generator is required for all devices.

In yet another alternative embodiment, such as the embodiment illustrated in FIG. 5, a single interrupt generator or controller is provided within the host so that only a single interrupt generator is required for all devices, independent of type or number. This configuration takes the advantages of the aforementioned configuration even further by reducing the number of interrupts to the predetermined number (e.g. 500 interrupts) for all of the devices configured to the interrupt generator.

Of course, other variations of these ganged or clustered interrupt generation may be implemented. For example, a number of disk drives might share a single (master) interrupt generator, while there may be a plurality of interrupt generators (master and slave) for other devices. Other variations include systems incorporating both hardware interrupt generators and controllers implementing software interrupt generation.

Figure 6:
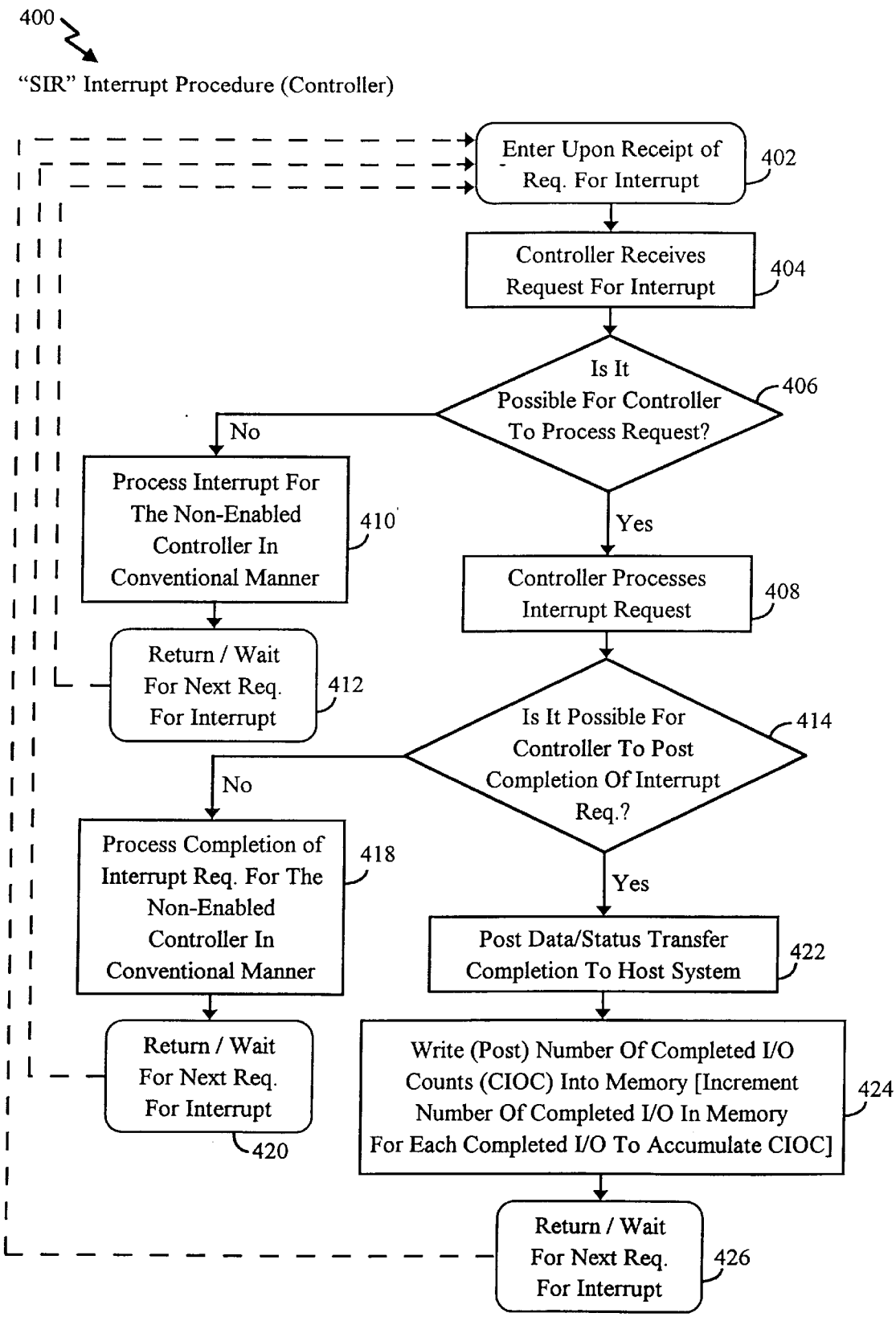
FIG. 6 is a flow chart diagram of an exemplary embodiment of a system interrupt reduction slave (secondary) controller procedure.

An exemplary software or firmware based procedure 400 for the portion of a system interrupt reduction method occurring in the slave or secondary controller procedure is now described relative to the flow-chart diagram in FIG. 6. Recall that the computer system includes a host processor (CPU) and a first plurality of peripheral devices coupled to the host processor by some number of peripheral device controllers. The number of peripheral device controllers is typically fewer than the number of controlled devices. One of the peripheral device controllers is chosen or identified as a master controller and the other controllers are slave or secondary controllers. Interrupts to the "system" or host computer are reduced by monitoring the occurrence of input/output operations, and then delaying acting on the interrupts in a controlled manner so as to reduce disruption of host processor operations. One embodiment of the inventive procedure, which we refer to as the System Interrupt Reduction Slave Controller Procedure (SIR-SCP) 400 and method, are described relative to FIG. 6.

The SIR-SCP procedure 400 is entered and executed by each master or slave controller upon receipt of a request for interrupt (RFI) by the controller (Step 402, 404) that was generated by the device. For some systems, that contain a mixture of new and old controller hardware, some of the controllers may not be compatible with the inventive procedure because, for example, in a software/firmware implementation the controller may not have implemented the required logic. Or, in a hardware implementation, either the host or the controller does not provide the hardware interrupt generator. Therefore, an initial determination is made as to whether the particular device controller receiving the RFI is enabled to delay processing of the requested interrupt (Step 406) and: (I) if the particular device controller is enabled to delay processing of the requested interrupt then delaying processing of the interrupt according to some set of predetermined rules (Step 408); and (ii) if the particular device controller is not enabled to process the requested interrupt with delay, then processing the interrupt in conventional manner without delay according to the capabilities of the controller (Step 410). In one embodiment of the invention, processing the interrupt with delay includes posting data and status transfer completion to the host memory (Step 422).

After the enabled controller has processed the interrupt request (Step 408), the enabled controller determines if the device controller is enabled to post completion of the interrupt request to the host (Step 414) and, (iii) if the device controller is enabled to post completion of the interrupt request, then the controller posts or writes data and status transfer completion information to the host (Step 422), and posts the number of completed input/output into the master/slave memory (Step 424); otherwise (if said device controller is not enabled to post completion of the interrupt request), the controller posts completion of the interrupt request in conventional manner (Step 418).

Conventional processing of a controller interrupt typically includes (i) identifying the controller, (ii) acknowledging the interrupt to the controller, (iii) identifying the completed request, and (iv) post-processing the completed request. Conventional controller posting of completion of the interrupt request typically includes: (i) posting data, (ii) posting status, and (iii) generating interrupt to the host.

After controller posting of the number of completed input/output counts (Step 424), processing of the interrupt for the non-enabled controller (Step 410), or posting of the completion of the completion of the interrupt by the non-enabled controller (Step 418), the SIR-SCP procedure (400) returns to the entry point and waits for the next request for interrupt (Steps 412, 418, or 426).

In one embodiment of the inventive method, the SIR-SCP procedure for delaying processing of the interrupt includes posting data and status transfer completion to the host (Step 422). The posting of data and status transfer completion to the host comprises writing data and status to memory. In another embodiment, the SIR-SCP procedure also includes writing or posting the number of completed input/output counts (CIOC) into a memory or other storage means (Step 424). This may be accomplished directly by writing the cumulative number of counts for a given time period, by incrementing a stored count for each complete input/output operation to accumulate the CIOC, or by other accounting means known in the art. Neither high accuracy nor knowledge of the absolute count are necessarily required, as the accumulated CIOC count will be used in a comparison operation to compare the accumulated CIOC from one period of time with the accumulated CIOC from a later period of time. In one embodiment, 4 Bytes (32 bits) are used. Even if for some reason (low probability), insufficient bits are provided and the bits for the current count are identical to the bits for the prior count, then the interrupt will be delayed for one period. So long as this is a low probability occurrence, the sacrifice in performance is substantially zero.

Figure 7:
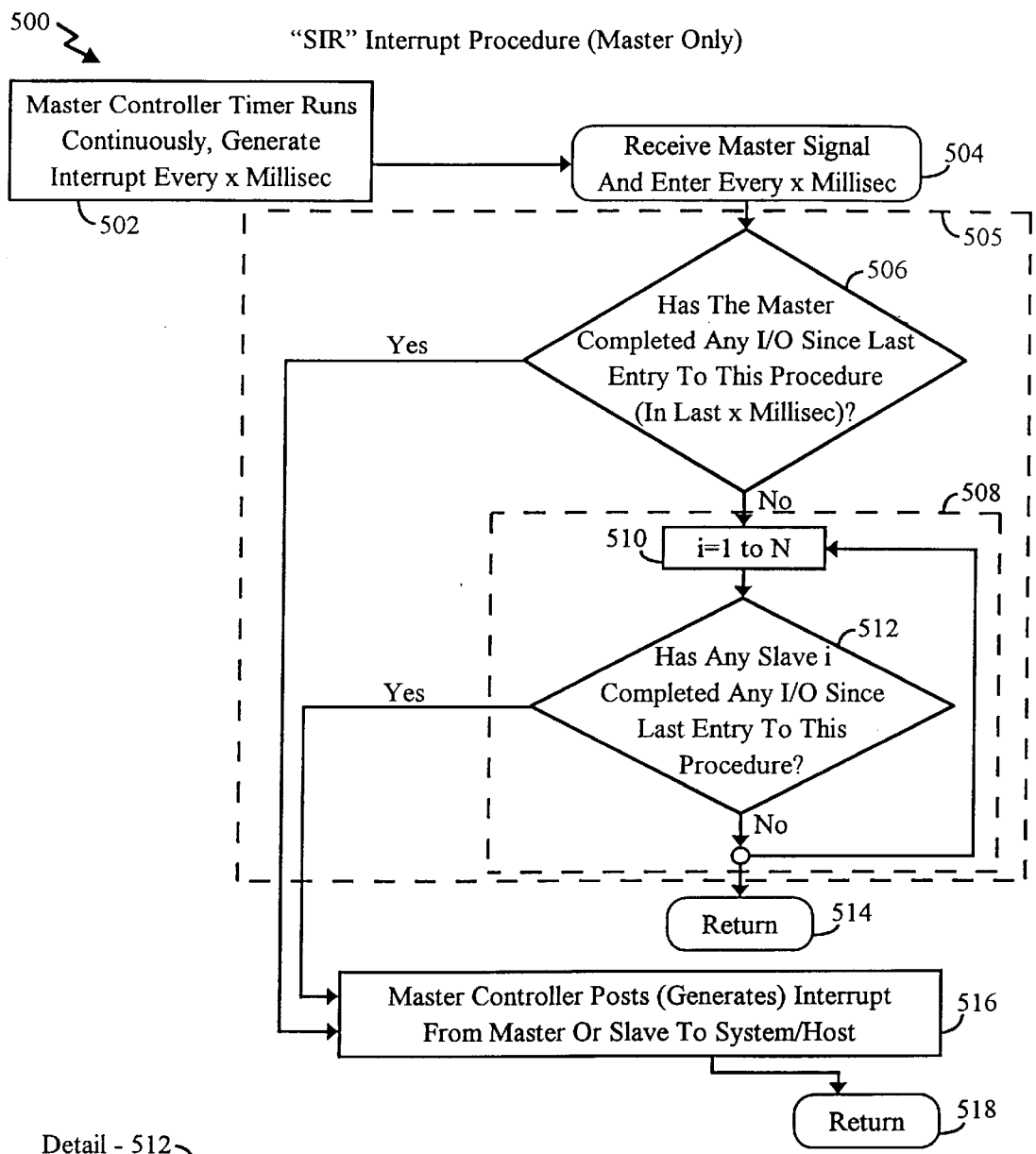
FIG. 7 is a flow chart diagram of an exemplary embodiment of a system interrupt reduction master (primary) controller procedure.

We now turn our attention to the operation of the master or primary controller relative to the slave controllers and the host. FIG. 7 is a diagrammatic flow chart illustration of an exemplary procedure for a system interrupt reduction master (primary) controller procedure, which we refer to as the SIR-MCP. The SIR-MCP procedure is executed or entered at predetermined intervals. These predetermined intervals may be fixed or variable, and may also be programmable. In one embodiment of the invention a clock or time runs continuously to generate a timer signal (timer interrupt) at predetermined time intervals. The time interval is chosen in accordance with consideration given to a trade-off between delay and response time, such that the delay is acceptable without sacrificing response time. It is the type of tuning that a system designer or system administrator may perform based on the characteristics of the connected devices, the purpose for which the system is operated, and other comparable parameters.

For example, in embodiments of the invention, the timer interrupt interval to the master controller has be set in the range from about 0.1 millisecond to about 10 millisecond. More usually the timer interrupt interval is set between 1 millisecond and 5 millisecond, and values of substantially 1 millisecond, 2 millisecond, and 3 millisecond have been used. Of course as the speed of computer system components increases, one would expect the range of timer interrupt interval to be adjusted in accordance with the evolving technology so that different ranges of timer interrupt interval may be appropriate. The timer interrupt interval may be preset, programmable, or may be under control of a statistically based feedback routine that adjusts the interval according to system or controller loading, and or other parameters. Furthermore, the timer interrupt interval or period may be stored in a memory store, hardwired or coded in some manner, or otherwise implemented in accordance with conventional practice.

Upon entry or initiation of the SIR-MCP procedure every x-millisecond, a determination is made as to whether the master controller or any other peripheral device controller has completed any input/output since the last entry of the SIR-MCP procedure—that is, within a predetermined elapsed time period (Step 505). If such an input/output interrupt has occurred during the current interval, the a master controller interrupt (MCI) signal is generated by the master controller and communicated to the host (Step 516). In no input/output interrupt has occurred by any of the master or associated slave controllers during the current interval or alternatively after the master controller posts the interrupt, then the SIR-MCP procedure terminates and returns to the calling procedure to wait for the next timer interrupt (Step 514 or 518).

In one embodiment, the predetermined time interval is a time interval defined by a periodic clock signal, and the clock signal is generated by operating a clock within the master controller or deriving the timer interrupt signal from a clock signal communicated to the master controller from an external source, the clock in either case operates substantially continuously and generating a master controller timer interrupt signal every period of time t (Step 502). In this embodiment, the master controller performs the testing to determine whether any controller has completed any input/output (Step 505) every t seconds in response to receipt of each master controller timer interrupt signal.

In another embodiment of the invention, the step of testing the controllers to determine whether any master or slave controller has completed any input/output within a predetermined elapsed time period (Step 505) includes testing each slave controller according to predetermined rules for any slave controller that has completed at least one input/output (Step 530), where such determination may be limited to finding in any one controller has completed any input/output, and then generating a signal indicating that at least one controller has completed an input/output operation (Step 531).

In still another embodiment, the predetermined rules include testing each slave controller sequentially (Step 510) until a controller that has completed at least one input/output is identified (Step 512) and in response stopping testing of each slave, and then generating the signal indicating that at least one controller has completed an input/output operation (Step 516).

In yet another embodiment, the inventive structure and method for the SIR-SCP and SIR-MCP includes providing a memory storage within host memory for storing a completed input/output count (CIOC) for each controller (Step 532) (the CIOC optionally being initialized to a predetermined count (e.g. zero) after the master controller has communicated the master-host interrupt to the host to inform the host of the all interrupts pending by the controllers (Step 533) during the time period, and then incrementing or otherwise accumulating a count or value or generating a signal representing the CIOC for each completed input/output operation by the controller (Step 534). For this embodiment, the testing of each particular controller according to predetermined rules comprises querying the stored (accumulated) CIOC at predetermined time intervals, where the query includes reading a prior CIOC stored during the prior time interval (Step 541), reading a current CIOC stored during the present time interval (Step 542), and generating a first signal (Step 544) indicating that input/output has been completed since the last predetermined interval if the present CIOC is not equal to the prior CIOC (Step 543), and otherwise not generating the first signal or generating a second signal indicating that no input/output has been completed by the particular controller since the last predetermined interval (Step 545).

Figure 8:
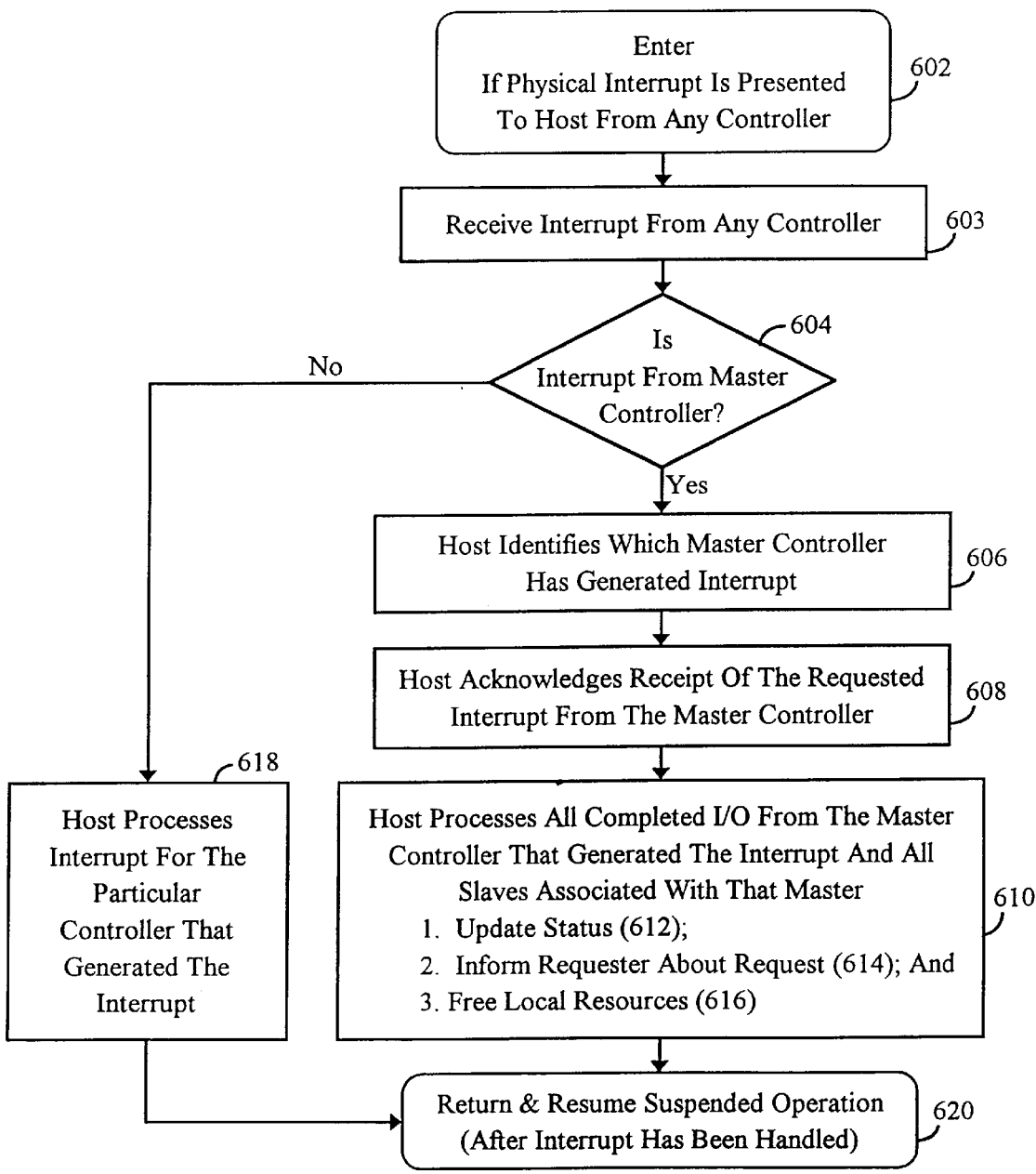
FIG. 8 is a flow chart diagram of an exemplary embodiment of a system interrupt reduction host interrupt procedure.

We now turn our attention to the host-master controller interaction. An exemplary procedure for a system interrupt reduction host interrupt procedure is now described relative to FIG. 8. The inventive structure and method further provide in the system or host port, circuit, register, or other interrupt signal receiving means for receiving and identifying an interrupt communicated from a controller. In general the interrupt may have been communicated by a master controller or any other controller, such as a non-enabled controller. The host receives the transmitted interrupt from the controller, including from a master controller or any one of said plurality of controllers (Step 603), and determines if the received interrupt was a master controller generated interrupt (604). If the received interrupt was a master controller generated (MCG) interrupt, then, the host: (i) identifies the particular master controller that generated the MCG interrupt (Step 606); (ii) acknowledges receipt of the MCG interrupt to the master controller that generated the interrupt (Step 608); and (iii) processes all completed input/output from the particular master controller and from all slaves associated with the particular master controller (Step 610). If the received interrupt was not a master controller generated interrupt, then within the host, the interrupt is processed in conventional manner for the controller that generated the interrupt (Step 618); and in either case: operation of the suspended activity is resumed after the interrupt has been processed (Step 620).

In one particular embodiment of the invention, processing all completed input/output from the particular master controller and from all slaves associated with the particular master controller, includes: (a) updating status (Step 612) such as, for example, that 10 Kbytes were requested but only 5 Kbytes were received; (b) informing the requestor that the requested item (e.g. data) is ready (Step 614); and (c) freeing local resources (Step 616), such as for example, memory allocated and special resources.

Figure 9:
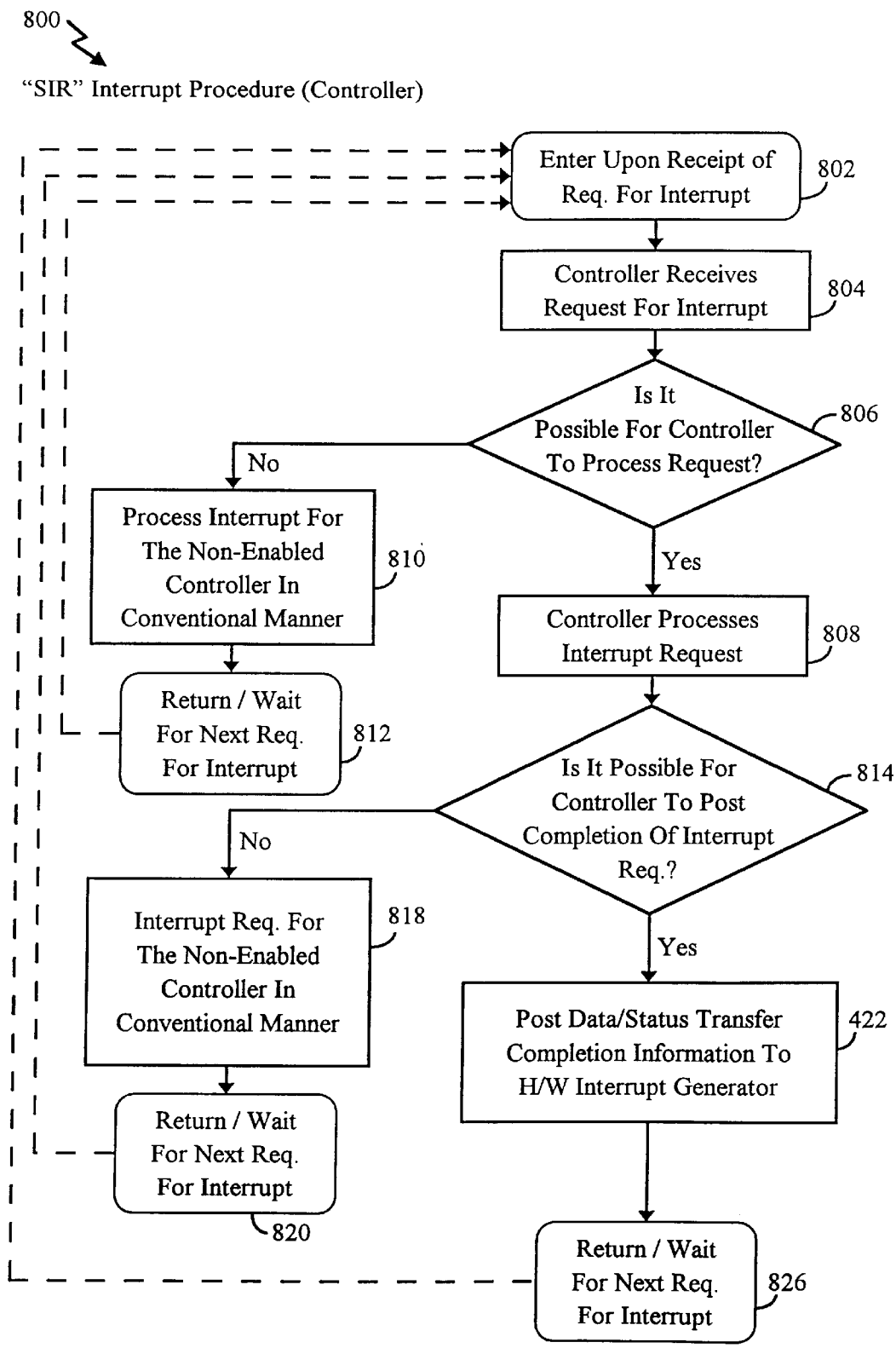
FIG. 9 is a flow chart diagram of an exemplary embodiment of a system interrupt reduction slave (secondary) controller procedure implemented in special hardware.

One embodiment of the inventive procedure, which we refer to as the System Interrupt Reduction Slave Controller Procedure (SIR-HWSCP) 800 and method, are described relative to FIG. 9. The SIR-HWSCP procedure 800 is entered and executed by each master or slave controller upon receipt of a request for interrupt (RFI) by the controller (Step 802, 804). For some systems, that contain a mixture of new and old controller hardware, some of the controllers may not be compatible with the inventive procedure. Therefore, an initial determination is made as to whether the particular device controller receiving the RFI is enabled to delay processing of the requested interrupt (Step 806) and: (i) if the particular device controller is enabled to delay processing of the requested interrupt then delaying processing of the interrupt according to some set of predetermined rules (Step 808); and (ii) if the particular device controller is not enabled to process the requested interrupt with delay, then processing the interrupt in conventional manner without delay according to the capabilities of the controller (Step 810). In one embodiment of the invention, processing the interrupt with delay includes posting data and status transfer completion to the hardware interrupt generator (HIG) (Step 822).

After the enabled controller has processed the interrupt request (Step 808), the enabled controller determines if the device controller is enabled to post completion of the interrupt request (Step 814) and, (iii) if the device controller is enabled to post completion of the interrupt request, then the controller posts or writes data and status transfer completion information to the hardware interrupt generator (Step 822); otherwise the controller posts completion of the interrupt request in conventional manner (Step 818).

After controller posting of the data and status transfer completion information to the hardware interrupt generator (Step 822), processing of the interrupt for the non-enabled controller (Step 810), or posting of the completion of the completion of the interrupt by the non-enabled controller (Step 818), the SIR-HWSCP procedure (800) returns to the entry point and waits for the next request for interrupt (Steps 812, 818, or 826). In one embodiment of the inventive method, the SIR-HWSCP procedure for delaying processing of the interrupt includes posting data and status transfer completion to the host (Step 822).

Figure 10:
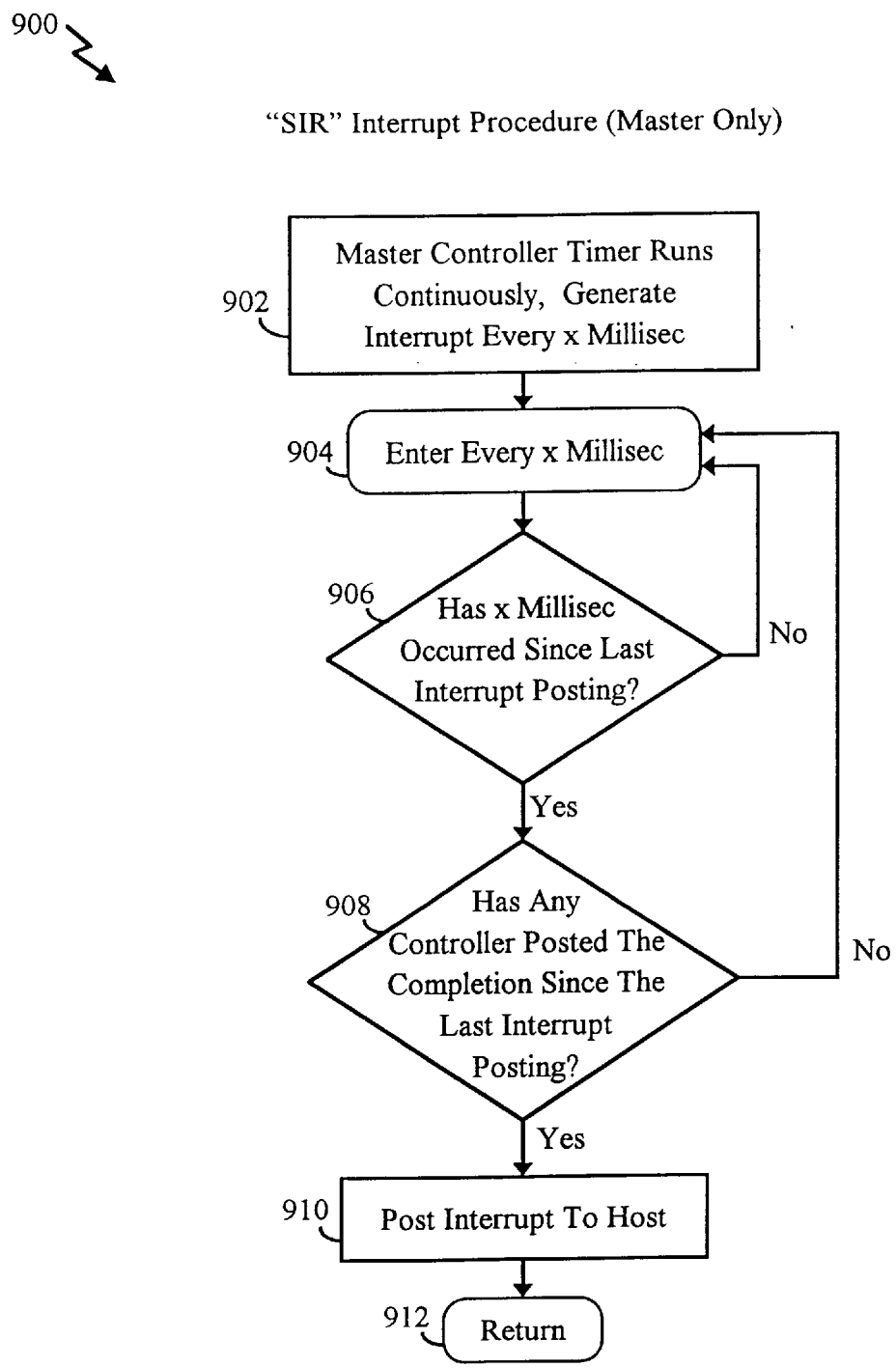
FIG. 10 is a flow chart diagram of an exemplary embodiment of a system interrupt reduction master (primary) controller procedure implemented in special hardware.

An exemplary procedure for a system interrupt reduction master (primary) controller procedure (SIR-HWMCP) 900 implemented in special hardware (the hardware interrupt generator) is now described relative to FIG. 10. Master controller timer runs continuously and generates a master controller interrupt signal at predetermined intervals, for example every x milliseconds (Step 902) where the number of milliseconds is selected according to rules that tune the system to have the desired response characteristics. Receipt of the master controller interrupt signal initiates the SIR-HWMCP procedure (Step 904) which executes at the same periodic intervals. Alternatively, the procedure may be viewed as running continuously in a loop (Step 906) and performing certain operations within the loop if the predetermined interval since the last execution has lapsed.

Under either implementation, a determination is made as to whether any controller has posted an input/output completion since the last interrupt completion (Step 910). If their have been no postings, then the procedure is iterated and a subsequent determination is made during the next time interval. On the other hand, if a controller has posted an input/output completion, then interrupt is posted the to the host (Step 910).

We now describe an alternative procedure that is conceptually a simplification of the System Interrupt Reduction structure and method already described. We refer to these procedures as Adapter Interrupt Reduction (AIR). AIR provides certain rules and procedures respective of when completion of a system interrupt should be posted to the host. A fundamental premise to AIR is not to post completion of interrupt on every completed input/output operation, but instead to accumulate a count and compare the count to a threshold. When the accumulated count has some predetermined magnitude relationship with the threshold (typically greater than, equal to, or the like) the interrupts are posted. This is a simplification of the SIR procedure described since AIR is event "count" or "counter" based rather than "time" or "timer" based as for SIR. In the SIR procedure we wait predetermined time periods, in the AIR procedure we wait predetermined number of counts. The SIR and AIR procedures also differ in that AIR is implemented within each controller or adapter. The AIR may be implemented completely in software or firmware or in hardware.

We first consider an exemplary numerical example of how the processing overhead is reduced with only a slight increase in response time. The increase in response time is typically expected to be negligible and decreases with faster system. In each of the examples described below in Table I, we assume that a fixed number of interrupts are generated each second independent of the number of I/O operations performed per second.

TABLE I

Exemplary Effect of Number of Interrupts per Second on ResponseTime.

| Number of Interrupts per Second | Average Increase in Response Time | Maximum Increase in Response Time | Minimum Increase in Response Time |
|---|---|---|---|
| 6,000 [conventional] | 0.0 ms [conventional] | 0.0 ms [conventional] | 0.0 ms [conventional] |
| 1,000 | 0.5 ms | 1.0 ms | 0.0 ms |
| 500 | 1.0 ms | 2.0 ms | 0.0 ms |
| 250 | 2.0 ms | 4.0 ms | 0.0 ms |
| 100 | 5.0 ms | 10.0 ms | 0.0 ms |

For example, one exemplary embodiment of the invention implements a set of rules wherein input/output completion is to be posted to the host when either: (i) a first predetermined number of input/output have completed and a second predetermined number of input/output are pending; or (ii) when a predetermined amount of time has expired after posting the first input/output completion after the last posted system interrupt. More particularly, in one embodiment, the interrupt is posted when at least twenty-five percent (25%) of pending input/output (that is, the total of completed input/output plus non-completed input/output pending on any particular controller) has been completed. A typical pending input/output count and completed input/output count for posting are illustrated in Table II. Of course other alternative rules for posting the interrupt may be implemented.

TABLE II

Exemplary Rule for Posting Interrupt

| Number of Pending Input/Output Operations | Number of completed Input/Output to Post Interrupt | Comments |
|---|---|---|
| 1 | 1 | No attempt to optimize for 1–3 |
| 2 | 1 | pending IO Operations |
| 3 | 1 | |
| 4 | 2 | Threshold count as indicated |
| 5 | 2 | |
| 6 | 2 | |
| 7 | 3 | Threshold count as indicated |
| 8 | 3 | |
| 9 | 3 | |
| 10 | 4 | Threshold count as indicated |
| 11 | 4 | |
| 12 | 4 | |
| 13 | 4 | |
| 14 | 5 | Threshold count as indicated |
| 15 | 5 | |
| 16 | 5 | |
| . | . | |
| . | . | |
| . | . | |
| 32 | 8 | Threshold count as indicated |
| 33 | 8 | |
| . | . | |
| . | . | |
| . | . | |
| 64 | 10 | Threshold count as indicated |

This count based Adapter (or Controller) Interrupt Reduction (AIR) has some limitations over the timer based SIR approach. In some situations, it is possible that all pending input/output may be taking a relatively long time as compared to a different request that comes in a takes a relatively short time. For example, a magnetic tape rewind or a CD-ROM access may typically take longer than a hard disk drive access. For an event counter based approach, each event nominally has the same weight independent of its duration. Where a system includes both fast and slow response devices, some additional benefit is provided by posting the system interrupt to the host in response to a timer which generates an indication or signal after some predetermined amount of time has expired after posting the first input/output completion. This predetermined timer timeout may typically be chosen to be between 25% and 100% of the average response time, but the timer timeout is not limited to this range.

For example, for a disk drive device which has a average response (access) time of about 8 millisec, the timer timeout value would typically be set between 2 millisec (25% value) and 8 millisec (100% value). The inventive Adapter Interrupt Reduction method may readily be implemented in software or firmware procedures executing on the controller hardware. They may also be implemented in special purpose hardware which implements the same procedure.

Figure 11:
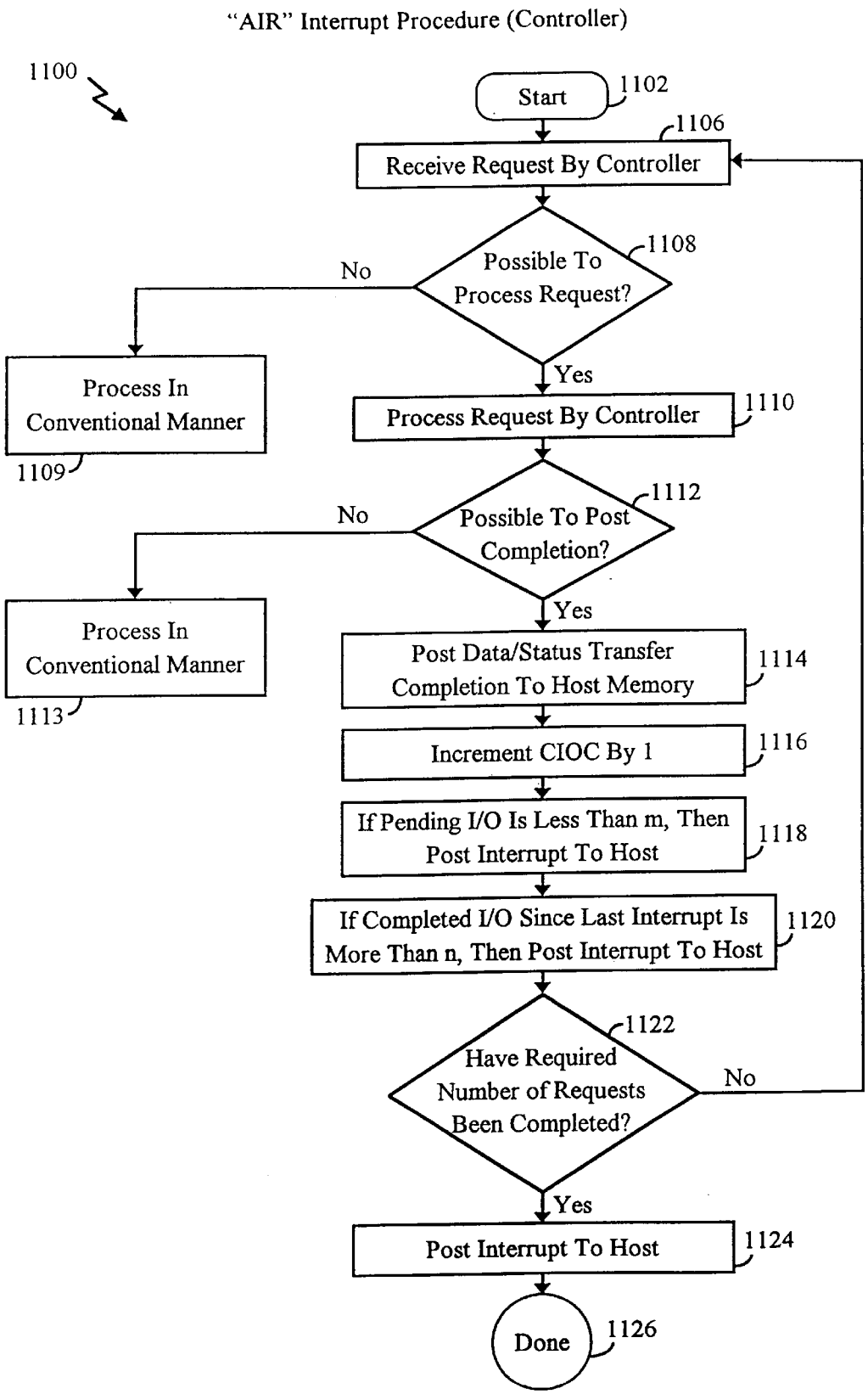
FIG. 11 is a flow chart diagram of an exemplary embodiment of an adapter interrupt reduction slave (secondary) controller procedure.

An exemplary procedure for an adapter interrupt reduction slave (secondary) controller procedure 1100 is now described relative to FIG. 11. The AIR-SCP procedure 1100 is entered upon receipt of a request by the controller (Step 1106). In order to accommodate equipment that may not be enabled to implement the AIR procedures, the procedure includes optional steps to accommodate different hardware implementations. After receipt of the request (Step 1106), the controller determines whether it is possible to process the request (Step 1108). If it is possible to process the request, it is processed (Step 1110). The controller then determines whether it is possible to post completion of the input/output to the host memory (Step 1108). If it is possible to post completion (Step 1112), then the controller posts data/status transfer completion to host memory (Step 1114).

The number of completed input/output is incremented by 1 (Step 1116). Completion is posted to the host under predetermined conditions. In one embodiment, if the number of pending input/output is less than some predetermined number z (for example, in one embodiment z=8), then the interrupt is posted to the host (Step 1118). Furthermore, if the number of completed input/output since the last interrupt, then post the interrupt to the host (Step 1120).

The controller continues to receive requests, process requests, and post data/status transfer completion until a predetermined number of requests have been completed. Once the predetermined number of requests have been completed, the controller posts the interrupt to the host (Step 1124) for interrupts. It is noted that this description refers to "posting data/status transfer completion" and "posting the interrupt."

Figure 12:
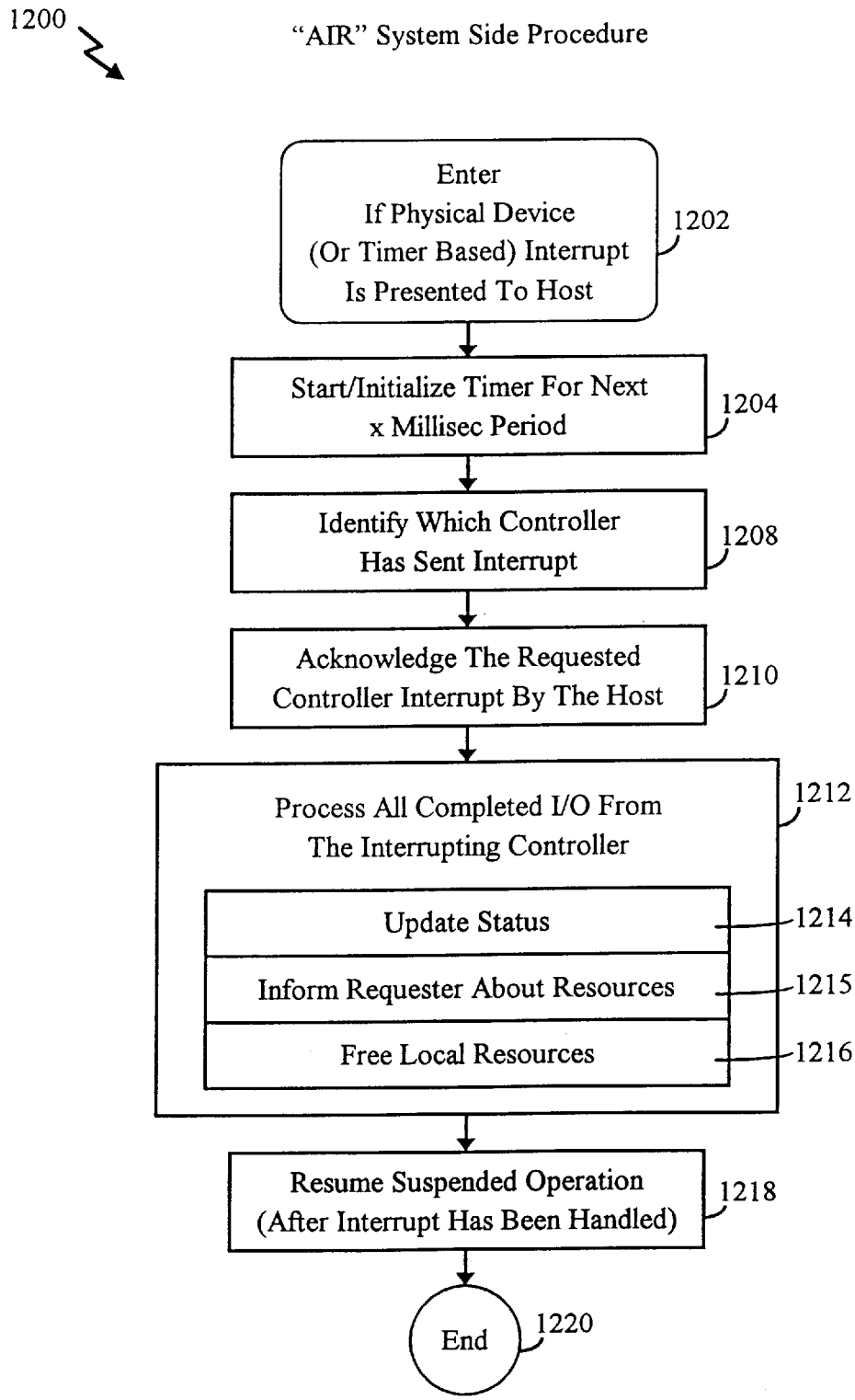
FIG. 12 is a flow chart diagram of an exemplary embodiment of an adapter interrupt reduction host controller procedure.

An exemplary procedure for an adapter interrupt reduction host controller procedure is now described relative to FIG. 12. The procedure in entered upon receipt of a physical interrupt to the host system by any controller (Step 1202). In an alternative embodiment the procedure may alternatively or additionally be entered in response to a timer timeout condition (Step 1203). Upon receipt of the controller generated interrupt, the host identifies which controller sent the interrupt (Step 1208) and acknowledges receipt to the sending controller (Step 1210). The host then processes all completed input/output from the particular controller (Step 1212). Processing the completed input/output may for example include, updating status (Step 1214), informing the requestor about the request (Step 1215), and freeing local resources (Step 1216). Host operations, suspended earlier are resumed (Step 1218) after processing the completed input/output.

Figure 17:
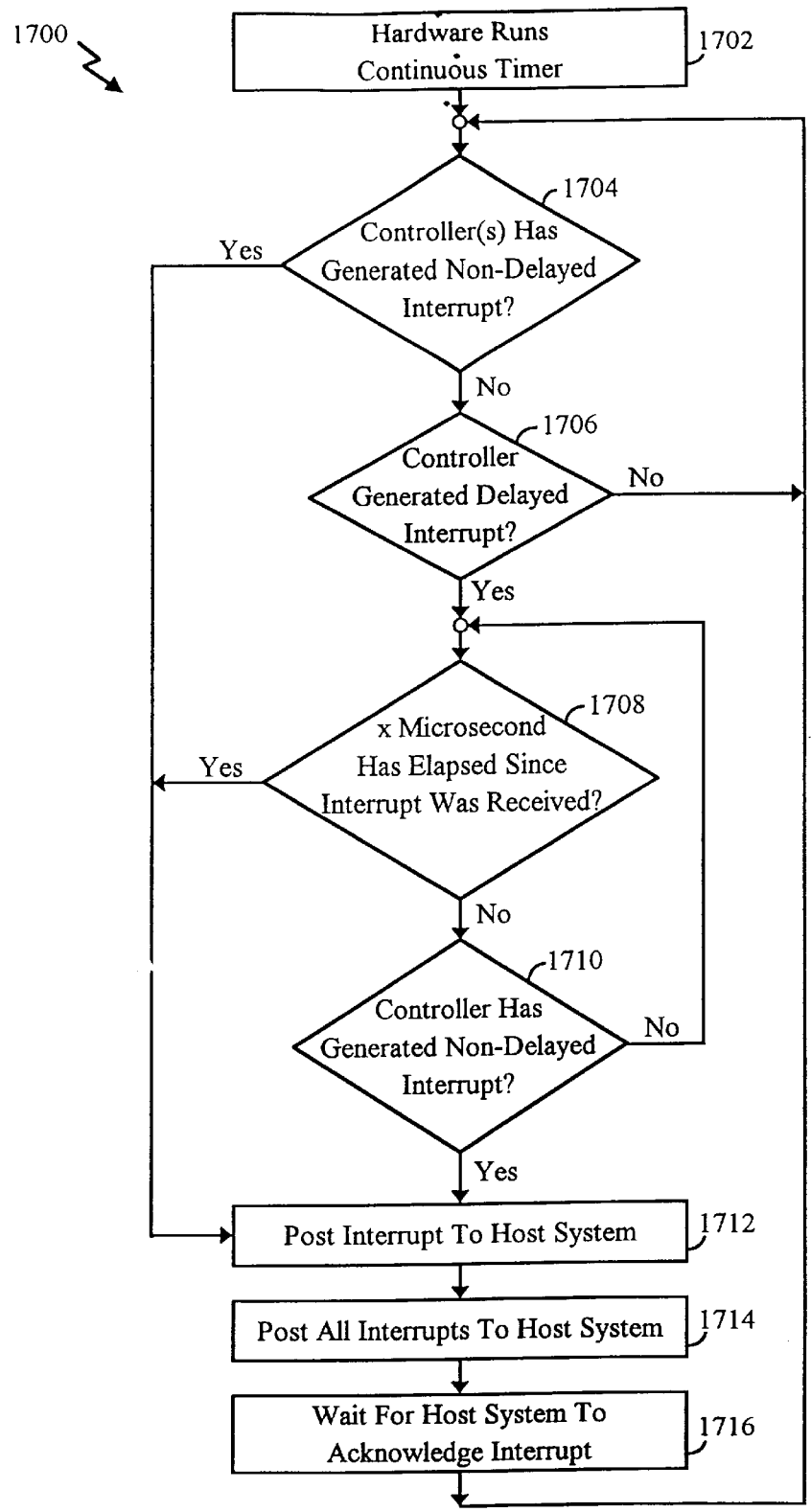
FIG. 17 is a flow chart diagram of aspects of an exemplary system interrupt procedure implemented in an embodiment of an Hardware Interrupt Generator (HIG).
Figure 18:
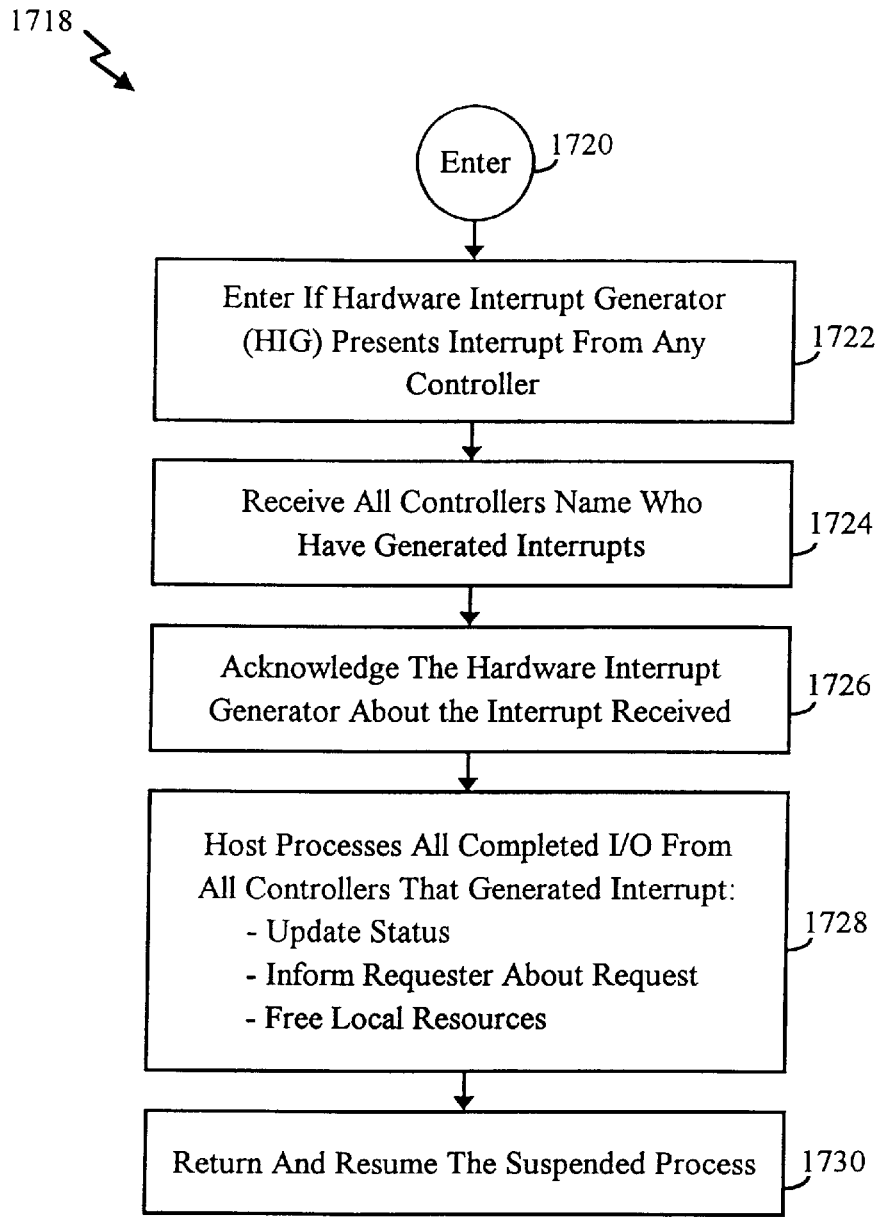
FIG. 18 is a flow chart diagram of aspects of an exemplary embodiment of a system interrupt procedure executing on the host in connection with the Hardware Interrupt Generator procedure of FIG. 17.

FIG. 17 is a flow chart diagram of aspects of an exemplary system interrupt procedure 1700 implemented in an embodiment of an Hardware Interrupt Generator (HIG), and FIG. 18 is a flow chart diagram of aspects of an exemplary embodiment of a system interrupt procedure 1718 executing on the host in connection with the Hardware Interrupt Generator procedure of FIG. 17. These two procedure work together, one on the controller side (FIG. 17) and the other on the host or system side (FIG. 18) to provide the desired operation. We describe each in turn, appreciating that they actually execute or are performed concurrently.

The Hardware Interrupt Generator (HIG) includes a timer the runs continuously (Step 1700). A determination is made as to whether the controller or controllers have generated a non-delayed interrupt, such as an I/O interrupt (Step 1704). If such a non-delayed type interrupt has been generated within the predetermined time period, the interrupt is posted to the host system (Step 1712). But, if no non-delayed interrupt was generated, the controller next checks to see if a controller generated a delayed interrupt (Step 1706). If no delayed interrupts have been generated, the controller cycles and continuously checks for non-delayed and delayed interrupts (Steps 1704 and 1706).

Once a determination has been made that controller generated delayed interrupt has been generated (Step 1706), a further test is performed to determine if some predetermined time period has elapsed (for example, "X milliseconds", where X is a number) since the interrupt was received (Step 1708). If this predetermined time period has elapsed, the interrupt is posted to the host system (Step 1712). This is to assure that any delays are reasonable, and that interrupts are posted within some predetermined time period independent of other activity.

If the predetermined time period has not elapsed since the interrupt was received (Step 1708), then an additional test is performed to determine if the controller has generated a non-delayed interrupt (Step 1710). If it has, the interrupt(s) are posted to the host system (Step 1712), but if the controller has not generated a non-delayed type interrupt the process cycles (Steps 1708 and 1710) until either the predetermined time period has elapsed or the controller generates a non-delayed interrupt.

After any particular interrupt has been posted to the host (Step 1712), all interrupts are posted to the host (Step 1714), and the controller (or interrupt generator) waits for the host system to acknowledge the interrupt (Step 1716).

On the host system side, the complementary procedure begins when the hardware interrupt generator (See FIG. 17) presents an interrupt from any controller (Step 1722). The host receives all controllers names who have generated interrupts (Step 1724), and acknowledges the hardware interrupt generator that the interrupt was received (Step 1726). (See also Step 1714 and 1716 for HIG post of interrupt and wait for acknowledgment of posting.) The host processes all of the completed I/O from all controllers that generated interrupt (Step 1728), where the processing may generally include updating status, informing the requestor about the request, and freeing local resources. Finally, the procedure (1718) returns and resumes any processes that may have been suspended to handle the interrupt.

We now describe an additional aspect or enhancement to the inventive SIR and AIR structure and method referred to as Clustered Command Completion. Clustered Command Completion advantageously utilizes, but may be practiced independently of the particular System Interrupt Reduction or Adaptor Interrupt Reduction structures and methods already described.

The inventive Clustered Command Completion advantageously operates in an environment where the number of interrupts are reduced so that other overhead resulting from interrupt processing generally is reduced. For example, the reduction may be achieved by controlling the number of interrupts by delaying communication of the interrupt to the host computer or processor according to predetermined rules. Reducing the number of interrupts effectively reduces the processing overhead and greatly increases system performance, particularly in a system including RAID disk drive storage arrays. Structure and method for reducing computer host system interrupts and adaptor interrupts is disclosed in co-pending U.S. Provisional Patent Application Serial No. 60/088,201 filed Jun. 5, 1998 and titled "APPARATUS AND METHOD FOR COMPUTER HOST SYSTEM AND ADAPTOR INTERRUPT REDUCTION" which is hereby incorporated by reference in its entirety.

One procedure described in the above referenced patent application, includes the following steps: detecting the occurrence of an input/output interrupt related to a device; reserving notification to the host processor of the input/output interrupt for a period of time according to predetermined rules; and notifying the host processor of all input/output interrupts for which notification has been reserved during the period of time at the expiration of the period of time. Other variations of this process are described in the Kailash patent application and furthermore, other structures and methods for reducing interrupts may alternatively be used. The use of a system interrupt reduction (SIR) scheme such as that described or a scheme offering comparable functionality (even if not the same degree of overhead or interrupt reduction) helps to collect all completed I/O requests at the same time without any additional burden. The particular embodiments of the invention described below typically assume that some system interrupt reduction scheme is operating.

The particular embodiments described also assumes that each structure passed for completion has at least one data field which can be used to chain the completed I/O request, and that every structure received for I/O request has at least one bit available to indicate if clustered completion can be done. The reasons the described embodiments benefit from having a data field for chaining and a bit available as a clustered completion enabled flag will be understood in the context of the detailed description below.

We now highlight some of the operational theory on which the inventive Clustered Command Completion (CCC) structure and method are based. Clustered Command Completion is a method in which items received from one or more device drivers (for example, a device driver in a disk drive controller) are clustered in a linked-list data structure and delivered to the requestor when an appropriate interrupt occurs. In the preferred embodiment of the invention, an appropriate interrupt is an interrupt which occurs under the System Interrupt Reduction procedures already described, however, other interrupt reduction procedures or schemes (independent of what they are called) may also be used. Such interrupt reduction schemes essentially collect the interrupts, and the clustered command completion gathers interrupts and sends them out simultaneously, in one embodiment as a linked list. The linked list is sent to the requestor all at the same time thereby minimizing the overhead and providing the advantages described herein.

By way of example, but not limitation, the inventive clustered command completion structure and method may advantageously be used for a network controller, a disk controller, a RAID controller, or any other device. Actually, the inventive procedure is typically implemented at the software/firmware driver level of the device controller. For example, embodiments of the CCC method may be implemented as software in a computer program product and/or as software which is loaded into RAM, ROM, or other memory of a controller as firmware.

Figure 13:
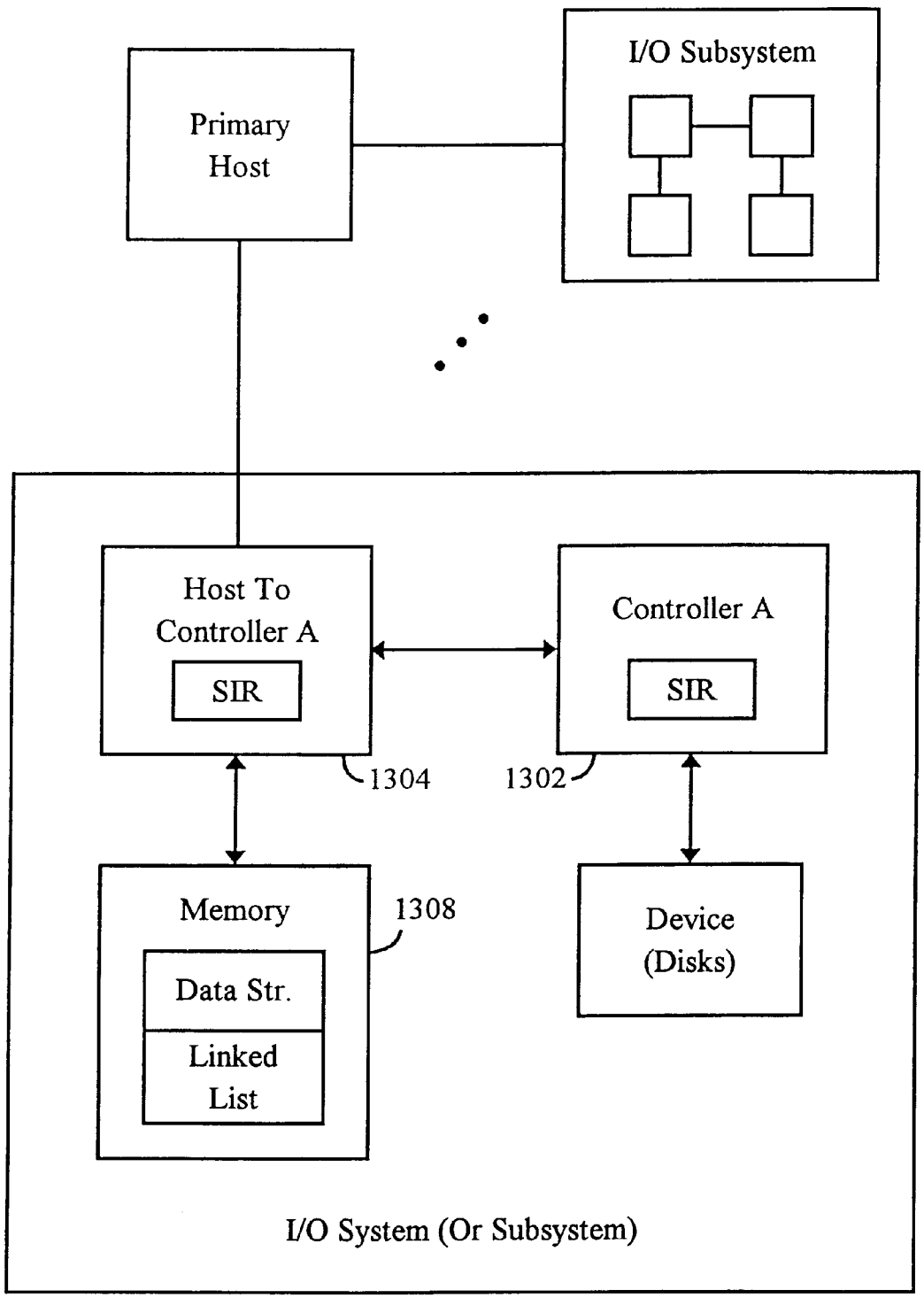
FIG. 13 is a diagrammatic illustration of an embodiment of a structure for lustered Command Completion.

One embodiment of the inventive CCC structure is illustrated in FIG. 13. We note that the inventive structure includes a controller 1302 in which portions of the interrupt reduction are accomplished as already described, coupled to a host processor 1304 in which the system side of the interrupt reduction procedure is accomplished, some controlled device 1304 such as a disk drive or a RAID system, and host memory 1306 in which is defined a linked list data structure as well as other buffers described in greater detail hereinafter to support the CCC procedures. The procedures executing on the host should understand the linked list data structure and be able to sense and utilize various flags identifying compatibility with the CCC procedure.

The combination of controller, controlled device(s), host to that controller, and host memory may itself define a complete I/O system, or may represent only an I/O subsystem which is part of a larger system having a main host 1310 and a plurality of subsystems.

The inventive CCC procedure advantageously executes in the device drivers of the controller host. An I/O request buffer 1402 is provided which includes a storage element for a clustered completion mode bit (CCM bit) 1404 as well as data and command status. It is noted that the requestor builds the I/O request buffer when it asks for data from a device. If a driver, such as a disk drive driver is capable of accepting the completed command in clustered mode for a particular data read or write request, it sets the clustered completion mode (CCM) bit in the I/O request buffer 1402. For example, a driver may set the CCM bit for read/write request but not for a management-type (IOCTL) request, which are typically rare events. The read/write request may be supported for CCM while IOCTL may not be supported because, one is not typically interested in performance for rare events such as management and it is not efficient to implement the complexity of the CCM procedure in such instances.

When an input/output (I/O) operation completes, an interrupt handler of the device driver performs several operations, including the following four operations: (i) Gathers all completed I/O requests (which can be completed in clustered mode) to same receiver function (same call back function or equivalent); (ii) Chain all completed request with last I/O in chain pointing to NULL or other selected token, where NULL identifies the end of the chain; (iii) Send completion to requester with one I/O pointer (having a single address) which is the head of the chained request and providing additional addresses for each element in the list via the linked list structure with the last element pointing to the afore described NULL; and (iv) free up all local resources, preferably in a single step based on the linked list. Freeing up all resources in this manner is advantageous, but optional and not required.

Having described the inventive concept and operations, we now describe one particular embodiment of the invention. For purposes simplifying this description of an exemplary embodiment so as not to obscure the characteristics of the invention, we assume that most of the read/write request will be coming from one requester at any given time. Under this assumption we will complete only one clustered command, and complete other I/O requests as individual commands. This assumption of a single read/write requestor is not a limitation of the invention itself.

Now we address some definitional matters. Posting completion refers to a process by which command status information is provided to the requestor. For example, posting completion may entail providing information that 512 bytes of data were read, that the read operation was successfully completed, that there were no read errors, or alternatively, that no bytes were read, that the read operation could not be completed, and the like. This is the conventional definition of posting completion for an I/O operation.

The Clustered Command Completion procedure provides for a data structure defined in host memory 1308 for providing a request buffer (mdac_req_t) 1402 used by a device driver, a chaining field (r_Next), and a clustered completion mode (CCM) bit which is part of a larger clustered completion operations flag (rq_OpFlags) having several bits. The other bits in the operations flag are not of particular concern to the CCC procedure, but may for example, include bits to indicate the nature of the operation (for example, read or write), whether the operation has been completed, whether any error occurred during the operation, and the like information. The request buffer is used for internal chaining and for storing an indication of clustered completion.

A first chain, referred to as Completed I/O Chain, is created for completed I/O by picking up all completed I/O request to the device driver interrupt handler. The Completed I/O Chain includes all completed I/O independent of whether clustering is enabled or not enabled for that driver or I/O. Completed I/O is typically picked up in time order sequence. A second chain, referred to as Clustered Completed I/O Chain, is created from the first Completed I/O Chain by filtering that first chain to separate clusterable items for those items that cannot or are chosen not to be clustered.

The interrupt handler, typically implemented by a firmware procedure in the device driver, performs the following steps to collect the completed I/O request and create Completed I/O Chain. First (Step 2701), the interrupt handler selects a controller for I/O completion from among the several controllers in the I/O system, and where required or desired, locks the controller (locking is typically required for multiprocessor system). Locking is desirable to prevent simultaneous access, and later unlocking again enables access by other processes. The controllers are generally selected in accordance to some predetermined rules, typically sequential order, or the like. The manner of selection may be conventional and is not important to the structure or operation of the invention and therefore not described further.

Second (Step 2702), the interrupt handler, selects a completed I/O request and completes all status in all aspects except for posting the completion to the requestor and optional statistics collection. Third (Step 2703), the interrupt handler chains the completed I/O (data and status) from the controller with previously completed I/O. Fourth (Step 2704), if there are more completed I/O requests, then the interrupt handler selects the next completed I/O, and the above steps (Steps 2701–2703) are performed in the similar manner. That particular controller is then unlocked (Step 2705) to reenable access by others. Fifth (Step 2706), if there are more controllers to be checked, the interrupt handler selects the next controller based on predetermined rules. For example, the interrupt handler may select the next sequential controller to check, or select the next controller according to a list stored on the system. The afore described steps of the process are then repeated for the next selected controller. (See FIG. 15.)

After all, or a predetermined set of, controllers have been checked, the interrupt handler performs the following procedures to post completion to the requestor and to create the Clustered Completed I/O Chain. In the preferred embodiment, all controllers are checked.

Posting completion to the requestor and creation of the second chain, or Clustered Completed I/O Chain, is performed by a procedure including the following steps. First (Step 2602), a NULL Clustered Completed I/O Chain is initiated or generated. Next (Step 2603), the first I/O request stored or identified in the previously created Completed I/O Chain is taken from the completed I/O chain and placed into the clustered completed I/O chain if it can be clustered, or posted in conventional manner if it cannot be clustered. Statistics may optionally be collected if desired if statistics collection is enabled (Step 2605).

If the particular I/O request taken from the Complete I/O chain does not have a clustered completion flag set (that is, if the CCM bit is not enabled, or if the operating system or device driver does not recognize CCC mode) then (Step 2606) the completion is posted to the requester in conventional manner (Step 2609).

If the Clustered Completed I/O Chain is NULL, queue this I/O request in the Clustered Completed I/O Chain and follow the procedure described above. If Clustered Completed I/O Chain is not NULL, and if this request does not have same completion function, that is the same name associated with the completion as the first name as previous clustered completed I/O (See Step 2608), post the completion to the requestor (Step 2609). It is noted that in this particular embodiment of the CCC procedure, the first entry in the linked list defined the name to be associated with the linked list. For example, if the first entry in the list is for a RAID device, then that list will be associated only with the RAID device. From this example, one may observe that this particular embodiment is optimized for a system having I/O requests predominantly from a single device type. However, the inventive CCC procedure described relative to this embodiment is applicable and readily extends to support multiple linked lists for a plurality of device types, and to provide an additional level of filtering to not only separate clusterable from non-clusterable entries, but also to select from among multiple clusters. In such instances, multiple Clustered Completed I/O chains would be generated and exist concurrently. Otherwise the essential CCC features and procedure remain the same.

If Clustered Completed I/O Chain is not NULL, then a determination is made as to whether the request has the same completion function as the previous clustered completed I/O. If it does, then that event is queued in the Clustered Completed I/O chain (Step 2610), otherwise the completion is posted to the requestor in conventional manner (Step 2609). Finally (Step 2611), post the completion to the requestor with first request in the Clustered Completed I/O Chain.

Figure 14:
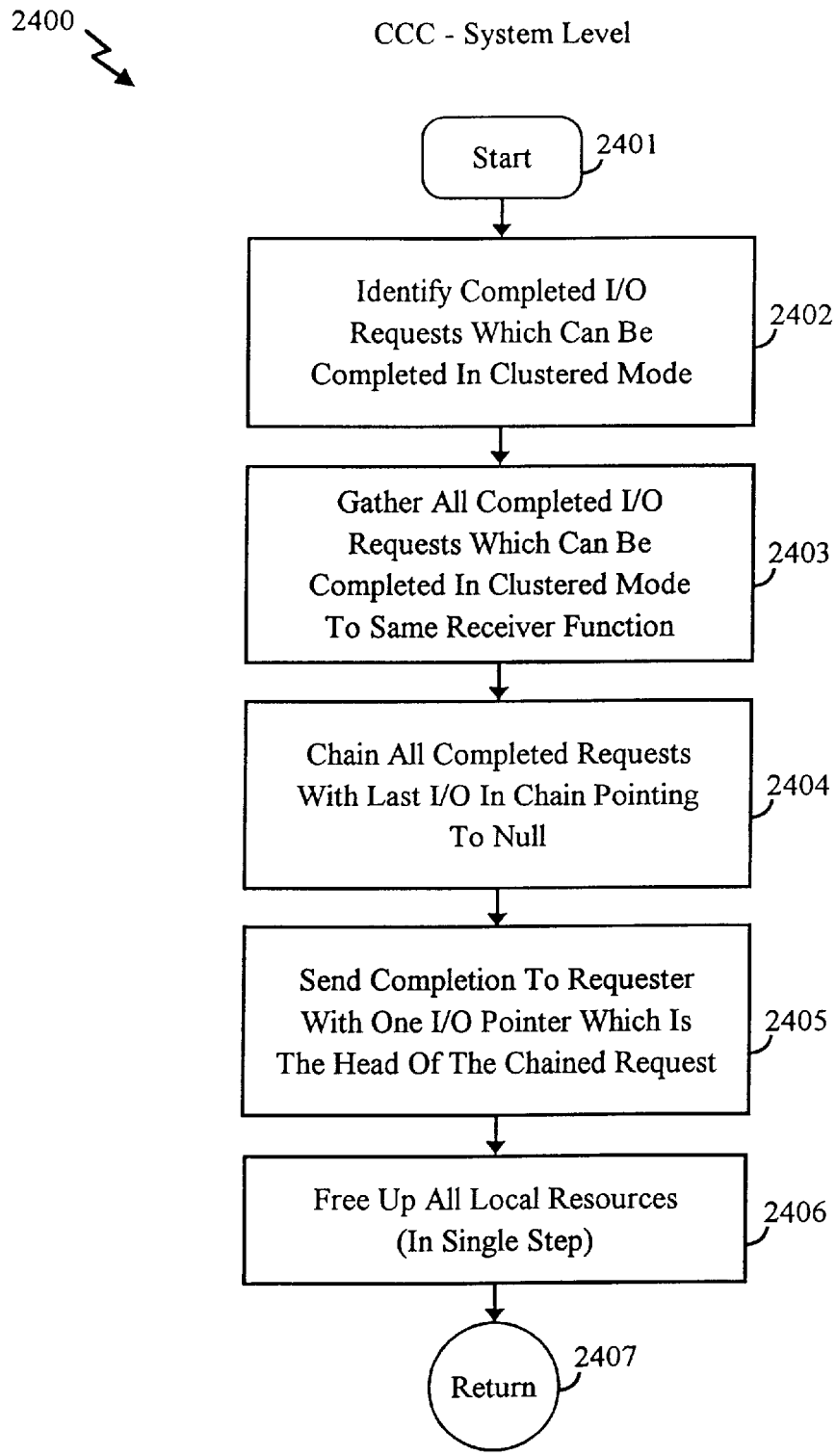
FIG. 14 is a flow chart diagram of aspects of an exemplary embodiment of an lustered Command Completion procedure.
Figure 15:
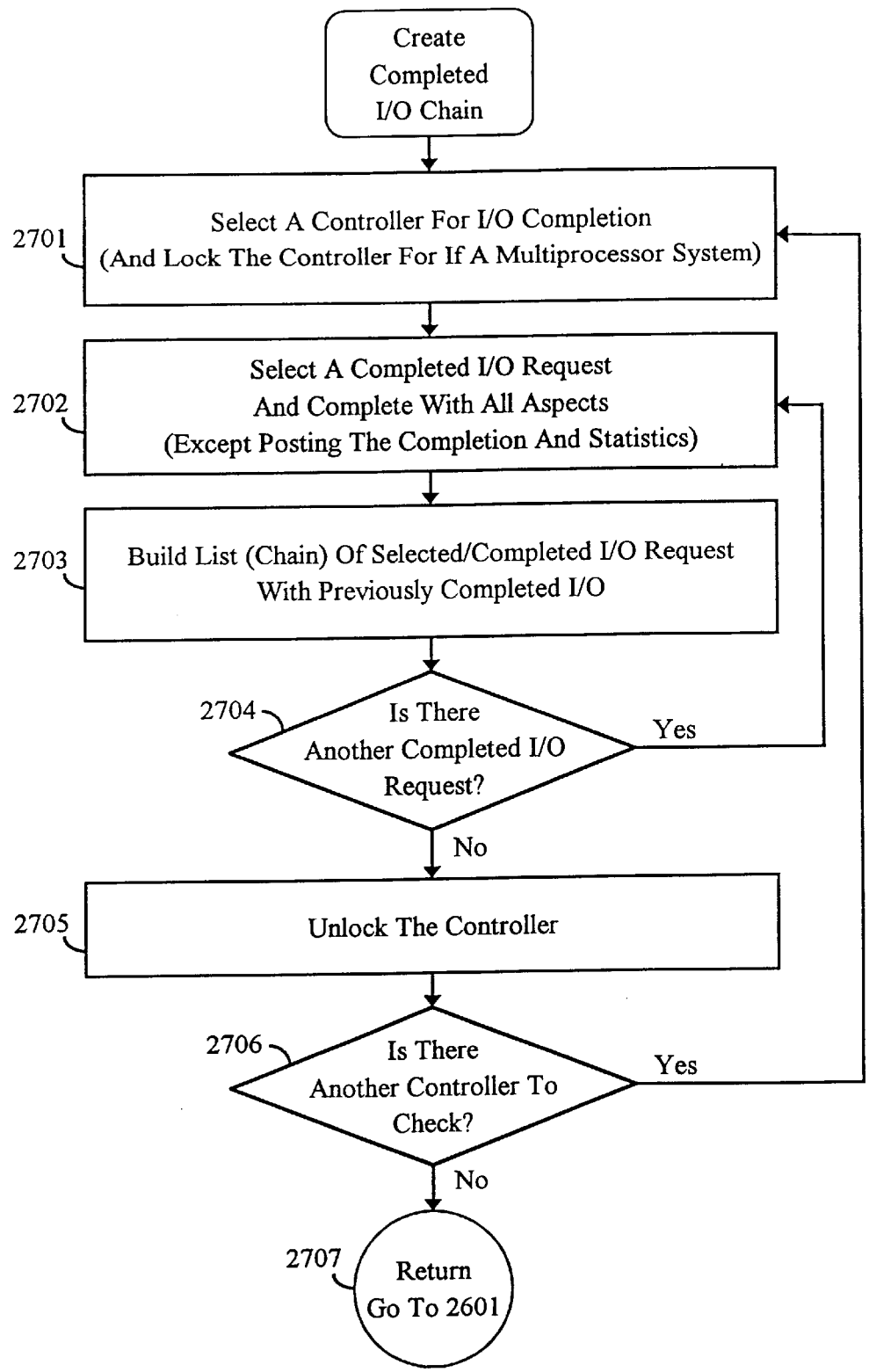
FIG. 15 is a flow chart diagram of aspects of an exemplary embodiment of an lustered Command Completion procedure.
Figure 16:
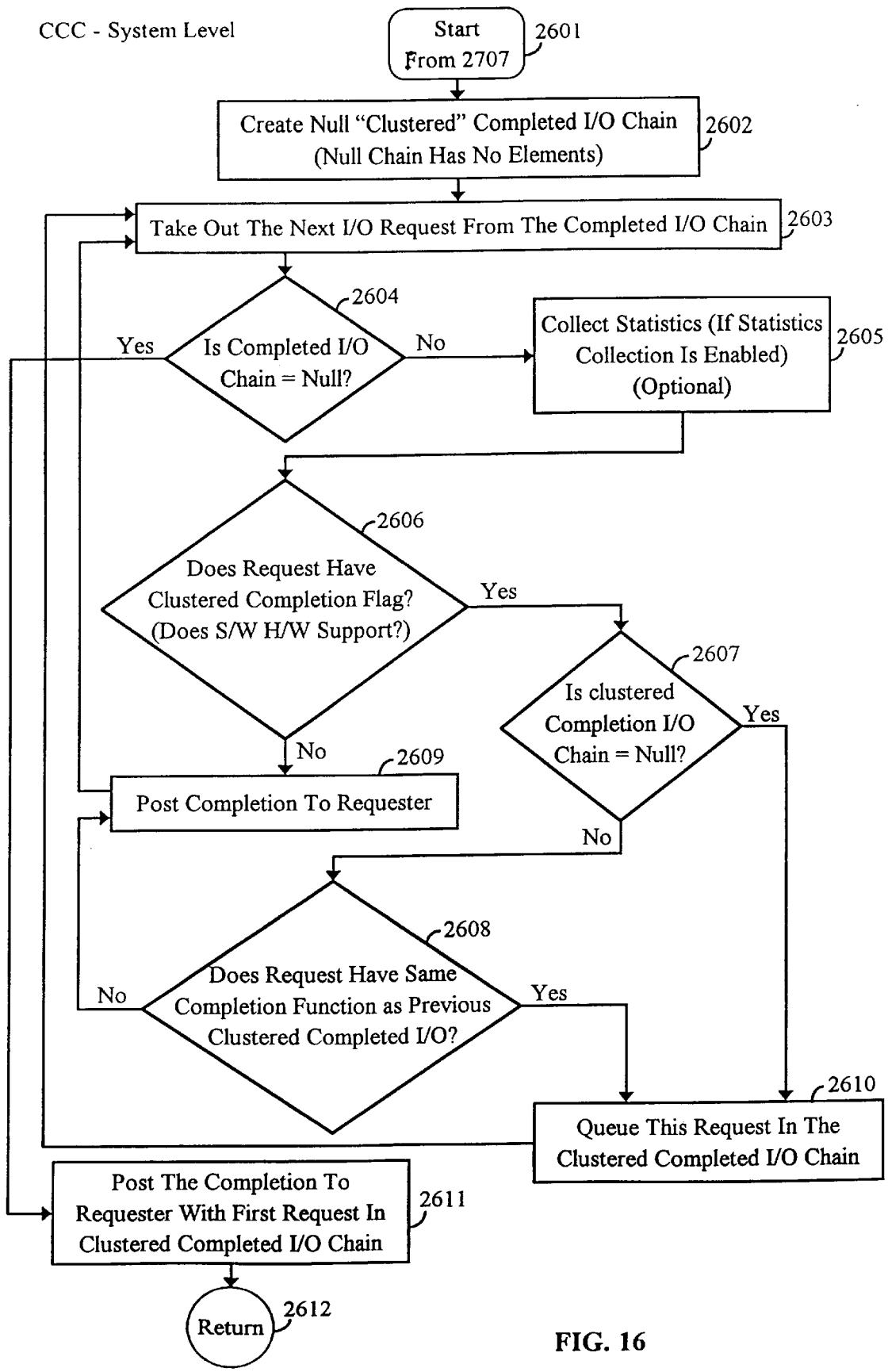
FIG. 16 is a flow chart diagram of aspects of an exemplary embodiment of an Clustered Command Completion procedure.

The diagrammatic flow chart illustrations in FIG. 14, FIG. 15, and FIG. 16 illustrate exemplary embodiments of top level chain generation (FIG. 14), first chain generation (FIG. 15), and second chain generation (FIG. 16) respectively.

In the above described method and procedures, certain of the steps described may be considered advantageous or beneficial but are optional and not required, for example at least the following steps (among others) may be eliminated or modified, without detracting from the fundamental character of the invention: For example, one may optionally provide either single or multiple clustering as described. Collection of statistics is optional. Finally, other interrupt reduction procedures may be used instead of the inventive SIR or AIR procedures described herein. For example, under one interrupt reduction procedure, no interrupts are generated for outgoing data, the data is merely sent, and that is enough.

We now consider the effect on the overhead on a very light load. If interrupt handler posts one I/O request per clustered completion, it adds little extra overhead compared to non-clustered completion. Every layer may typically be expected to add at least six extra instructions to overhead. The overhead arises from (i) completion overhead and from (ii) free buffer/resource overhead. Completion overhead includes: (a) instruction(s) to save the head of I/O request (one or two instructions), (b) one compare instruction, and (c) one jump instruction. Free buffer/resource overhead includes: (a) instruction(s) to restoring the head of I/O request (one or two instructions), (b) one compare instruction, and (c) one jump instruction. If system is not loaded or only very lightly loaded, this little extra overhead does not matter much for other than purely academic reasons.

The foregoing description, for purposes of explanation, used specific nomenclature to provide a thorough understanding of the invention. However, it will be apparent to one skilled in the art that the specific details are not required in order to practice the invention. In other instances, well known structures and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. Therefore, while the invention has been described with reference to specific embodiments, the description is illustrative of the invention and is not to be construed as limiting the invention. Thus, various modifications and amplifications may occur to those skilled in the art without departing from the true spirit and scope of the invention as defined by the appended claims.

All publications and patent applications mentioned in this specification are herein incorporated by reference to the same extent as if each individual publication or patent application was specifically and individually indicated to be incorporated by reference.

What is claimed is:

1. A clustered command completion input/output system comprising:
   a controller executing a first set of programmed instructions to perform controller-side interrupt reduction;
   a host processor, coupled to said controller, executing a second set of programmed instructions to perform host-side interrupt reduction;
   a controlled device, coupled to said controller;
   a memory coupled to said host processor storing a data structure in which is defined a linked list; and
   a buffer having a plurality of bits for storing indicator flags.

2. The clustered command completion input/output system in claim 1, wherein said controlled device is selected from the group consisting of a hard disk drive, a Redundant Array of Independent Disk (RAID) storage system, a plurality of disk drives, an information storage subsystem, and combinations thereof.

3. The clustered command completion input/output system in claim 1, wherein said data structure is defined in memory and stores:
   a request buffer used by a device driver for internal chaining and for storing an indication of clustered completion;
   a chaining field, and
   a multi-bit clustered completion operations indicator including a clustered completion mode (CCM) bit.

4. The clustered command completion input/output system in claim 1, wherein said buffer comprises storage locations within said memory, and said buffer further comprises an I/O request buffer which includes a storage element for a clustered completion mode bit (CCM bit) and a storage element for data and command status.

5. The clustered command completion input/output system in claim 1, wherein said clustered command completion input/output system comprises an input/output subsystem that is a component of a distributed computing system, said distributed computing system further including a distributed computing system main host processor.

6. The clustered command completion input/output system in claim 1, wherein said clustered command completion input/output system comprises an input/output subsystem that is a component of a distributed computing system.

7. The clustered command completion input/output system in claim 1, wherein said controller is selected from the group consisting of a network controller, a disk controller, a RAID controller, and combinations thereof.

8. In a computing system, a method for reducing processing overhead associated with posting command completion for input/output operations, said method comprising steps of:
   receiving items from one or more device drivers;
   clustering said received items into a linked-list data structure; and
   delivering the linked-list data structure to a requester when a predetermined interrupt condition occurs.

9. The method in claim 8, wherein said device driver includes a disk drive device driver.

10. The method in claim 8, wherein said predetermined interrupt condition comprises an interrupt occurring as a result of a system interrupt reduction procedure.

11. The method in claim 10, wherein said computer system includes a host processor and a first plurality of peripheral devices coupled to said host processor by a second plurality of peripheral device controllers, one of said peripheral device controllers identified as a master controller, and wherein said system interrupt reduction procedure comprises, for each said peripheral device controller, the steps of:
   receiving a request for interrupt;
   determining if said device controller is enabled to delay processing of said requested interrupt and: (i) if said device controller is enabled to delay processing of said requested interrupt then processing said interrupt with delay; and (ii) if said device controller is not enabled to process said requested interrupt with delay, then processing said interrupt without delay; said processing with delay including posting data and status transfer completion; and
   determining if said device controller is enabled to post completion of the interrupt request, and: (iii) if said device controller is enabled to post completion of the interrupt request, then posting data and status transfer completion to said host; and (iv) if said device controller is not enabled to post completion of the interrupt request, then posting completion of the interrupt request.

12. The method in claim 8, wherein said computing system is selected from the group consisting of a network controller, a disk controller, a RAID controller, and combinations thereof.

13. In a computing system, a method for reducing processing overhead associated with posting command completion for a device operation, said method comprising steps of:
   generating a first chain of completed device operation including all completed device interrupt requests to a device driver interrupt handler; and
   generating a second chain from said first chain by filtering said first chain to separate clusterable items from non-clusterable items.

14. The method in claim 13, wherein said device operation comprises an I/O operation, said completed device interrupt request comprises an I/O interrupt request, and said device driver interrupt handler comprises an I/O interrupt handler.

15. The method in claim 14, wherein said non-clusterable items include items that cannot be clustered and items that are selected according to predetermined rules not to be clustered.

16. The method in claim 14, wherein said first chain includes all completed I/O operations independent of whether clustering is enabled for a particular driver or particular I/O.

17. The method in claim 14, wherein said first chain generation including steps of:
   (i) selecting a controller for I/O completion from among the several controllers in the I/O system;
   (ii) selecting a completed I/O request;
   (iii) completing all status for said selected completed I/O request except not posting the completion of the request to the requestor;
   (iv) chaining the completed I/O, including data and status, from the controller with any previously completed I/O in the chain; and
   (v) if there are more completed I/O requests, then repeating steps (ii)–(iv) for each other completed I/O request; and
   (vi) if there are more controllers to be checked, selecting a next controller based on predetermined rules, and repeating steps (i)–(v) for the next selected controller.

18. The method in claim 17, wherein said steps (i)–(iv) are performed by an interrupt handler implemented by a procedure in a device driver.

19. The method in claim 14, wherein said second chain generation including:
   (vii) initializing said second chain as the null chain having no members;
   (viii) identifying an I/O request in said first chain;
   (ix) determining if said identified I/O request is a clusterable request or a non-clusterable request;
   (x) placing said identified I/O request into said second chain if it is a request that can be clustered, and otherwise posting the I/O request if it is of a non-clusterable request;
   (xi) if said second chain is null and has no members, then associating the completion function corresponding to this I/O request with said Clustered Completed I/O chain, and queue this I/O request in said second chain, and repeating steps (viii)–(xi) for the next I/O request from said first chain;
   (xii) if said second chain is not null, then determining whether the current I/O request has the same completion function as the completion function associated with previous clustered completed I/O requests in said second chain; and if it has the same completion function, then queuing said current request in said second chain, and otherwise posting the completion to the requestor;
   (xiii) repeating the steps for all I/O requests in said first chain; and
   (xiv) if all I/O requests from said first chain have been processed, then posting the completion from all of said I/O requests in said second chain to the requestor.

20. The method in claim 19, wherein said first chain comprises a Completed I/O Chain, and said second chain comprises a Clustered Completed I/O Chain.

21. The method in claim 19, wherein said determining step queries a bit in a clustered completion indicator flag to determine if the I/O is clusterable or non-clusterable.

22. The method in claim 19, wherein said I/O is determined to be non-clusterable because the bit of the clustered completion indicator flag is not set, or because the operating system does not recognize clustered command completion mode operation, or because the device driver does not recognize clustered command completion mode operation.

23. The method in claim 14, wherein:
   said first chain generation includes steps of:
      (i) selecting a controller for I/O completion from among the several controllers in the I/O system;
      (ii) selecting a completed I/O request;
      (iii) completing all status for said selected completed I/O request except not posting the completion of the request to the requester;
      (iv) chaining the completed I/O, including data and status, from the controller with any previously completed I/O in the chain; and
      (v) if there are more completed I/O requests, then repeating steps (ii)–(iv) for each other completed I/O request; and
      (vi) if there are more controllers to be checked, selecting a next controller based on predetermined rules, and repeating steps (i)–(v) for the next selected controller; and
   said second chain generation including steps of:
      (vii) initializing said second chain as the null chain having no members;
      (viii) identifying an I/O request in said first chain;
      (ix) determining if said identified I/O request is a clusterable request or a non-clusterable request;
      (x) placing said identified I/O request into said second chain if it is a request that can be clustered, and otherwise posting the I/O request if it is a non-clusterable request;
      (xi) if said second chain is null and has no members, then associating the completion function corresponding to this I/O request with said Clustered Completed I/O chain, and queue this I/O request in said second chain, and repeating steps (viii)–(xi) for the next I/O request from said first chain;
      (xii) if said second chain is not null, then determining whether the current I/O request has the same completion function as the completion function associated with previous clustered completed I/O requests in said second chain; and if it has the same completion function, then queuing said current request in said second chain, and otherwise posting the completion to the requestor; and
      (xiii) repeating the steps for all I/O requests in said first chain; and
      (xiv) if all I/O requests from said first chain have been processed, then posting the completion from all of said I/O requests in said second chain to the requestor.

24. A computer program product for reducing processing overhead associated with posting command completion for device operations, the computer program product including a computer readable medium and a computer mechanism stored thereon, the computer mechanism comprising:
   generating a first chain of completed I/O including all completed I/O requests to a device driver interrupt handler; and
   generating a second chain from said first chain by filtering said first chain to separate clusterable items from non-clusterable items.

25. In a computer system having a host processor and a first plurality of peripheral devices coupled to said host processor by a second plurality of peripheral device controllers, one of said peripheral device controllers identified as a master controller, a method for reducing the number of system interrupts to said host processor comprising:

generating, by a timing circuit in said computer system, an interrupt every z seconds to provide said master controller interrupt;

for each said peripheral device controller:
  receiving a request for interrupt;
  determining if said device controller is enabled to delay processing of said requested interrupt and:
    (i) if said device controller is enabled to delay processing of said requested interrupt then processing said interrupt with delay; and
    (ii) if said device controller is not enabled to process said requested interrupt with delay, then processing said interrupt without delay; said processing with delay including posting data and status transfer completion; and
  determining if said device controller is enabled to post completion of the interrupt request, and:
    (iii) if said device controller is enabled to post completion of the interrupt request, then posting data and status transfer completion to said host; and
    (iv) if said device controller is not enabled to post completion of the interrupt request, then posting completion of the interrupt request.

26. In a computer system having a host processor and a first plurality of peripheral devices coupled to said host processor by a second plurality of peripheral device controllers, the computer system also including a hardware interrupt generator, one of said peripheral device controllers identified as a master controller, a method for reducing the number of system interrupts to said host processor comprising:

for each said peripheral device controller:
  receiving a request for interrupt;
  determining if said device controller is enabled to delay processing of said requested interrupt and:
    (i) if said device controller is enabled to delay processing of said requested interrupt then processing said interrupt with delay; and
    (ii) if said device controller is not enabled to process said requested interrupt with delay, then processing said interrupt without delay; said processing with delay including posting data and status transfer completion information to said hardware interrupt generator; and
  determining if said device controller is enabled to post completion of the interrupt request, and:
    (iii) if said device controller is enabled to post completion of the interrupt request, then posting data and status transfer completion to said host; and
    (iv) if said device controller is not enabled to post completion of the interrupt request, then posting completion of the interrupt request.

* * * * *